United States Patent
Thome et al.

(10) Patent No.: US 11,356,717 B2
(45) Date of Patent: Jun. 7, 2022

(54) RECEPTION OF A FLOW REPRESENTING A MULTIMEDIA CONTENT

(71) Applicant: Orange, Paris (FR)

(72) Inventors: Dominique Thome, Châtillon (FR);
Serge Rigaudeau, Châtillon (FR);
Stéphane Davenet, Châtillon (FR);
Lionel Racin, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/969,900

(22) PCT Filed: Feb. 5, 2019

(86) PCT No.: PCT/FR2019/050255
§ 371 (c)(1),
(2) Date: Aug. 13, 2020

(87) PCT Pub. No.: WO2019/158837
PCT Pub. Date: Aug. 22, 2019

(65) Prior Publication Data
US 2021/0014543 A1    Jan. 14, 2021

(30) Foreign Application Priority Data

Feb. 16, 2018 (FR) ...................................... 1851313

(51) Int. Cl.
*H04N 21/426* (2011.01)
*H04N 21/45* (2011.01)
(Continued)

(52) U.S. Cl.
CPC . *H04N 21/23424* (2013.01); *H04N 21/25891* (2013.01); *H04N 21/4532* (2013.01)

(58) Field of Classification Search
CPC ......... H04N 21/23424; H04N 21/4532; H04N 21/25891
See application file for complete search history.

(56) References Cited

U.S. PATENT DOCUMENTS 8,151,295 B1 * 4/2012 Eldering ............ H04N 21/4331
725/34
8,640,166 B1    1/2014 Craner
(Continued)

FOREIGN PATENT DOCUMENTS

EP    2 469 850 A2    6/2012
EP    2 645 731 A2    10/2013
(Continued)

OTHER PUBLICATIONS

International Search Report and Written Opinion dated Apr. 8, 2019 for Application No. PCT/FR2019/050255.

*Primary Examiner* — Hsiungfei Peng
*Assistant Examiner* — Fred Peng
(74) *Attorney, Agent, or Firm* — Knobbe, Martens, Olson & Bear, LLP

(57) ABSTRACT

A method for the reception of a flow representing a multimedia content is described, along with a device for receiving such a flow. The method includes determining that the restoration of first and second successive portions of the content modified by the restoration of respective first and second multimedia content, and activating a reading module for reading the first multimedia content, and another reading module for reading the second multimedia content, at a point in time prior to the end of the first portion. The method also includes alternately controlling the restoration of the first multimedia content and the second multimedia content during the reading of the first and second portions, respectively.

13 Claims, 12 Drawing Sheets

(51) Int. Cl.
*H04N 21/475* (2011.01)
*H04N 21/482* (2011.01)
*H04N 21/234* (2011.01)
*H04N 21/258* (2011.01)

(56) References Cited

U.S. PATENT DOCUMENTS

| | | | |
|---|---|---|---|
| 10,887,658 B2* | 1/2021 | Haberman | H04N 21/435 |
| 2007/0074243 A1 | 3/2007 | Verhaegh et al. | |
| 2009/0316896 A1* | 12/2009 | Plesse | H04N 21/2347 380/232 |
| 2014/0282759 A1 | 9/2014 | Harvey et al. | |
| 2020/0304868 A1* | 9/2020 | Ganjam | H04N 21/25808 |

FOREIGN PATENT DOCUMENTS

| | | |
|---|---|---|
| EP | 3 211 908 A1 | 8/2017 |
| WO | WO 2017/089690 A1 | 6/2017 |

\* cited by examiner

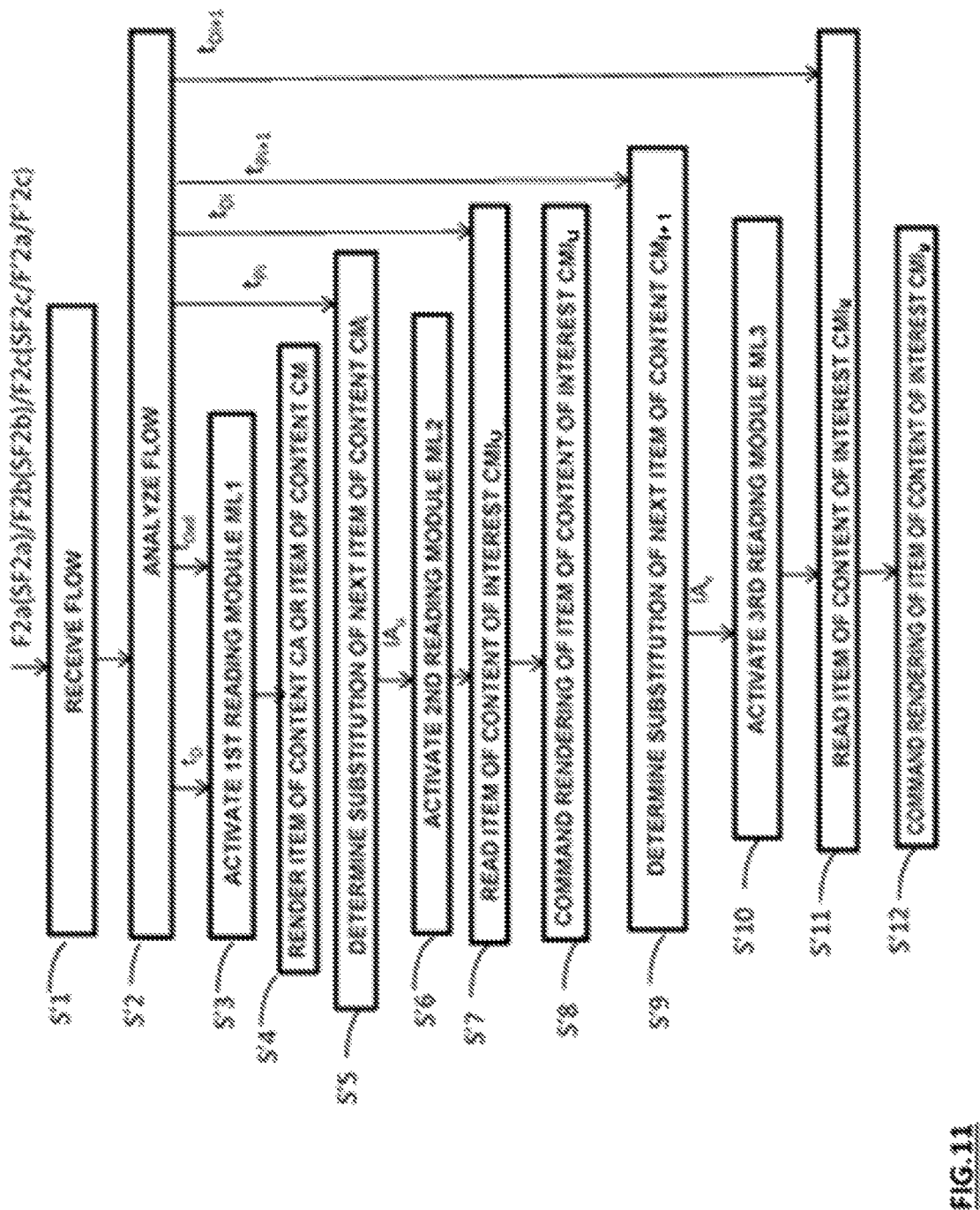

RECEPTION OF A FLOW REPRESENTING A MULTIMEDIA CONTENT

RELATED APPLICATIONS

This application is the U.S. National Phase of Application No. PCT/FR2019/050255 entitled "RECEPTION OF A FLOW REPRESENTING A MULTIMEDIA CONTENT" and filed Feb. 5, 2019, which claims the benefit of French Patent Application No. 1851313, filed Feb. 16, 2018, each of which is incorporated by reference in its entirety.

FIELD OF THE INVENTION

The field of the invention is that of the reception of flows in the audiovisual field.

The invention applies more particularly to the reception of a flow representative of an item of multimedia content, whether this item of multimedia content is broadcast live or downloaded from a content catalog.

The invention may in particular be implemented in a terminal provided with a user interface and a graphical interface, for example a tablet, a mobile telephone, a smartphone, a personal computer, a television connected to a communication network, etc.

PRESENTATION OF THE PRIOR ART

There are various types of multimedia content. A distinction is made for example between multimedia content broadcast live and multimedia content that the user is able to download individually from a content server.

Multimedia content broadcast live can be for example television programs that are transmitted via a data transmission network or else through the air, and then received by a reception terminal of a given user, such as for example a digital television receiver equipped with a set-top-box decoder.

Downloadable multimedia content is accessible from multimedia content catalogs, such as multimedia libraries, for example video on demand (VOD) catalogs, audio and/or video podcast catalogs, etc.

The flow that contains an item of multimedia content of the abovementioned type comprises various time markers, in particular a time marker for the start of the item of content and a time marker for the end of the item of content. In some cases, the item of multimedia content is interrupted at least once by an advertising break. To this end, the flow contains a time marker for the start of the advertising break and a time marker for the end of the advertising break. During the advertising break, various commercials are broadcast in the period between the markers for the start and the end of the advertising break.

One drawback of these advertising breaks lies in the fact that the commercials offered to a given user do not necessarily correspond to his/her interests. As a result, during the advertising break, in the case for example where the item of multimedia content is a television program, the user tends to change the channel and abandon the television program that he/she was watching before the advertising break, thus possibly impacting on the viewing figures of the channel that broadcasts this program.

There are solutions for substituting the advertising break dedicated to all of the users watching a given item of multimedia content with a targeted advertising break in relation to all or some of these users. To this end, a substitution module, installed either in the user's terminal or upstream, is designed to modify the item of multimedia content read by the reading module of the terminal by replacing the advertising break associated with this item of content with a targeted advertising break. The item of multimedia content modified in this way is then watched by the user.

These solutions are however complex to implement and require, upstream of the broadcasting of the flow containing the item of multimedia content and the associated advertising break, a relatively complex operation of assembling the commercials for the substitute advertising break. The fact that such an assembly operation is performed upstream of the broadcast may lead to a lack of interest on the part of the user for these substitute commercials when said user watches them, because they no longer correspond to the profile of the user, because said user has changed geographical area or even because the user's family situation has changed over time, etc.

In addition, these solutions are limited to the advertising context. Thus, for example, for a given item of multimedia content, such as in particular a film, for which there is no provision to interrupt it with an advertising break, it is currently not possible to modify the viewing of certain portions of the film in order to allow the user to view, instead of these portions or in addition to these portions, items of multimedia content matching his/her interests and/or his profile.

Lastly, these solutions are limited to a single type of multimedia content, that is to say of video or audio/video type. In particular, these solutions are not suitable for substituting out the audio rendering of one item of audio content by substituting in another item of audio content.

AIM AND SUMMARY OF THE INVENTION

One of the aims of the invention is to rectify drawbacks of the abovementioned prior art.

To this end, one subject of the present invention relates to a method for receiving a flow representative of an item of multimedia content, implementing the following, in the device for receiving the flow:
 activating a first reading module for reading the item of multimedia content,
 rendering the read item of multimedia content.

Such a method is noteworthy in that it implements the following:
 determining that the rendering of first and second successive and predefined portions of the item of multimedia content is modified by the rendering of first and second respective substitute items of multimedia content or items of multimedia content matching the interests of the user of the reception device,
 activating:
  a second reading module for reading the first item of multimedia content,
  a third reading module for reading the second item of multimedia content, the third reading module being activated at a predetermined time before the end time of the first portion of the item of multimedia content,
 alternately commanding the rendering of the first item of multimedia content and the second item of multimedia content at the time of reading, by the first reading module, of the first and second portions of the item of multimedia content, respectively.

The invention advantageously makes it possible to offer the user modification of the visual and/or audio rendering of two contiguous portions of an item of multimedia content through the visual and/or audio rendering of two respective substitute items of multimedia content or items of multimedia content that are tailored to the interests of this user. The fact that these two items of multimedia content are read respectively by two different reading modules makes it possible to dynamically modify the rendering of at least two successive portions of the item of multimedia content transported in the flow. Furthermore, by virtue of the presence of the second and third reading modules, which are designed to respectively read two different items of multimedia content, and the fact that the third reading module is activated at a time before the end time of the first predefined portion of the item of multimedia content, it is possible to offer the user the rendering of two successive substitute items of multimedia content or items of multimedia content that are tailored to the interests of the user, without any latency phenomenon at the time of rendering the second item of multimedia content. Such visual and/or audio rendering is advantageously commanded alternately such that the two substitute items of multimedia content or items of multimedia content tailored to the interests of the user are rendered to the user one after the other, without a break.

According to one particular embodiment, modifying the rendering of a given portion of the item of multimedia content consists in substituting the rendering of the given portion with the rendering of one of the first and second items of multimedia content.

The invention thus advantageously proposes an embodiment in which the rendering of an item of multimedia content is implemented instead of the rendering of a predefined portion of an item of multimedia content.

For example, if the portion under consideration of the item of multimedia content comprises an audio component and a video component, the rendering of the audio component and of the video component of this portion may be replaced:
  by rendering the audio component and the video component of a substitute item of multimedia content or an item of multimedia content tailored to the interests of the user, or
  by rendering only the video component of a substitute item of multimedia content or an item of multimedia content tailored to the interests of the user, or else
  by rendering only the audio component of a substitute item of multimedia content or an item of multimedia content tailored to the interests of the user.

According to another example, if the portion under consideration of the item of multimedia content comprises an audio component, in the case where the item of multimedia content is for example a radio program broadcast live or downloaded in the form of a podcast, the rendering of the audio component of this portion is replaced by the rendering of an audio component of a substitute item of multimedia content or an item of multimedia content tailored to the interests of the user.

According to another particular embodiment, modifying the rendering of a given portion of the item of multimedia content consists in rendering one of the first and second items of multimedia content during the rendering of the given portion.

The invention thus advantageously proposes an embodiment in which the rendering of a substitute item of multimedia content or an item of multimedia content tailored to the interests of the user is implemented during the rendering of a predefined portion of an item of multimedia content. Such a rendering mode is thus much more flexible than in the solutions from the prior art, which systematically propose complete substitution of an item of multimedia content with a substitute item of multimedia content.

According to one example, when the audio component and the video component of a given portion of an item of multimedia content are rendered, a graphical component (for example text banner or image or video thumbnail) of a substitute item of multimedia content or an item of multimedia content tailored to the interests of the user is rendered.

According to another example, when the audio component and the video component of a given portion of an item of multimedia content are rendered, an audio component of a substitute item of multimedia content or an item of multimedia content tailored to the interests of the user is rendered.

According to one particular embodiment, the activation of the second and of the third reading module is implemented following reading, in the flow, at a predetermined time before the start of the first portion of the item of multimedia content, of an item of access information for accessing the first item of multimedia content, and, at a predetermined time before the start of the second portion of the item of multimedia content, of an item of access information for accessing the second item of multimedia content.

Such an item of access information makes it possible, during the rendering of a current item of multimedia content, to advantageously anticipate modification of the rendering of a predefined portion of the item of multimedia content through the rendering of a substitute item of multimedia content or an item of multimedia content tailored to the interests of the user, such that the substitute item of multimedia content is rendered synchronously over the duration of the predefined portion.

According to another particular embodiment, the activation of the second and of the third reading module is implemented following reading, in the flow, at a predetermined time before the start of the first portion of the item of multimedia content, of an item of access information for accessing the first item of multimedia content and an item of access information for accessing the second item of multimedia content.

Such an item of access information makes it possible, during the rendering of a current item of multimedia content, to advantageously anticipate modification of the rendering of first and second successive predefined portions of the item of multimedia content through the respective rendering of the first and of the second item of multimedia content. Thus, the data of the first and second items of multimedia content are advantageously made available in the flow reception device, before the first and second portions of the current item of multimedia content are rendered.

According to another embodiment, the item of access information is deduced from an item of information corresponding to the item of multimedia content.

According to another particular embodiment, the item of access information is an identifier for multimedia content matching the interests of the user.

According to another particular embodiment, the item of access information contains an instruction for determining whether the rendering of a given portion of the item of multimedia content, which has not yet been read, may or may not be modified by the rendering of an item of multimedia content matching the interests of the user.

According to another particular embodiment, the item of access information is an access address for accessing, via a communication network, the first and/or the second item of multimedia content matching the interests of the user.

According to another embodiment, the item of access information is an item of user profile information.

According to another embodiment, the first and/or the second substitute item of multimedia content or item of multimedia content matching the interests of the user is accessible:
- from the reception device, and/or
- from a content storage device connected to the reception device via a communication network, and/or
- in a subflow associated with the received flow.

The fact that the substitute items of multimedia content or items of multimedia content matching the interests of the user are accessible directly from the reception device avoids congestion in the communication network that would be caused by launching numerous access requests to access a storage server storing these items of multimedia content, and makes it possible to anticipate the provision of such items of content before the predefined portions of the current item of multimedia content are rendered.

The fact that the substitute items of multimedia content or items of multimedia content matching the interests of the user are accessible from a content storage device connected to the reception device, via a communication network, nevertheless makes it possible to offer substitute items of multimedia content to users who for example either turn on their television receiver or radio set just before the rendering of the predefined portions of the current item of multimedia content or were watching another television program on another channel or were listening to a radio program on another radio station and, by changing channel or station to the television program under consideration or to the radio program under consideration, arrive during the rendering of the predefined portions of the current item of multimedia content, while still being able to benefit from the rendering of substitute items of multimedia content or items of multimedia content matching their interests.

The fact that a substitute item of multimedia content or an item of multimedia content matching the interests of the user is accessible in a subflow associated with the received flow allows direct access to this item of multimedia content for the reception device, thereby making the modification of the rendering of a portion under consideration of the current item of multimedia content less complex to implement and less expensive in terms of memory resources of the reception device.

The various abovementioned embodiments or implementation features may be added, independently or in combination with one another, to the reception method defined above.

The invention also relates to a device for receiving a flow representative of an item of multimedia content, comprising:
- a first reading module for reading the item of multimedia content,
- a rendering module for rendering the read item of multimedia content.

Such a reception device is noteworthy in that it comprises a processing module that is designed to implement the following:
- determining that the rendering of first and second successive and predefined portions of the item of multimedia content is modified by the rendering of first and second respective substitute items of multimedia content or items of multimedia content matching the interests of the user of the reception device,
- activating:
  - a second reading module for reading the first item of multimedia content,
  - a third reading module for reading the second item of multimedia content, the third reading module being activated at a predetermined time before the end time of the first portion of the item of multimedia content,
- alternately commanding the rendering of the first item of multimedia content and the second item of multimedia content at the time of reading, by the first reading module, of the first and second portions of the item of multimedia content, respectively.

The invention also relates to a computer program including instructions for implementing the reception method according to the invention when it is executed on a terminal or more generally on a computer.

Each of these programs may use any programming language, and be in the form of source code, object code, or of intermediate code between source code and object code, such as in a partially compiled form, or in any other desirable form.

The invention also targets a computer-readable recording medium on which there is recorded a computer program, this program including instructions suitable for the implementation of the reception method according to the invention as described above.

Such a recording medium may be any entity or device capable of storing the program. For example, the medium may include a storage means, such as a ROM or a RAM, for example a CD-ROM, a microelectronic circuit ROM or RAM, a USB key, or else a magnetic recording means, for example a hard disk.

Moreover, such a recording medium may be a transmissible medium such as an electrical or optical signal, which may be conveyed via an electrical or optical cable, by radio or by other means. The program according to the invention may in particular be downloaded from an Internet network.

As an alternative, the recording medium may be an integrated circuit in which the program is incorporated, the circuit being designed to execute or to be used in the execution of the abovementioned reception method.

The abovementioned corresponding reception device, computer program and recording medium have at least the same advantages as those conferred by the reception method according to the present invention.

LIST OF THE FIGURES

Other advantages and features of the invention will become more clearly apparent on reading the following description of a plurality of particular embodiments of the invention, given by way of simple illustrative and non-limiting example, and the appended drawings, among which:

FIGS. 1A and 1B schematically show two embodiments of an architecture in which the flow reception method according to the invention is implemented;

Figure 5:
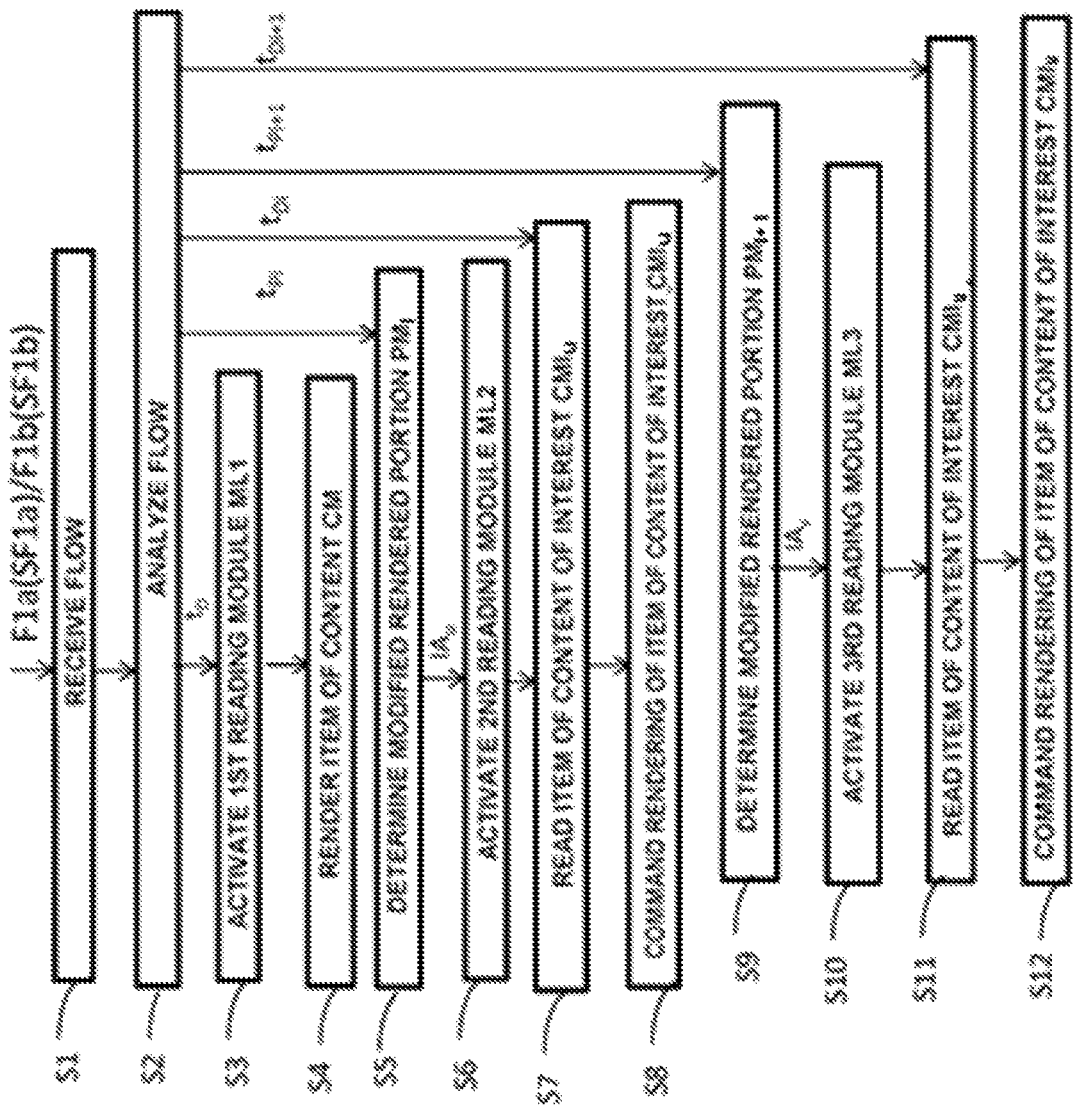
Figure 7A:
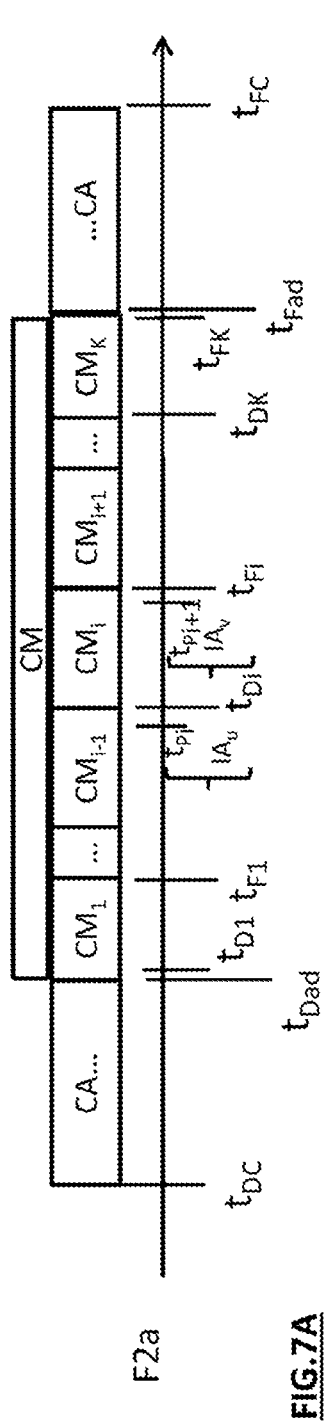
Figure 7B:
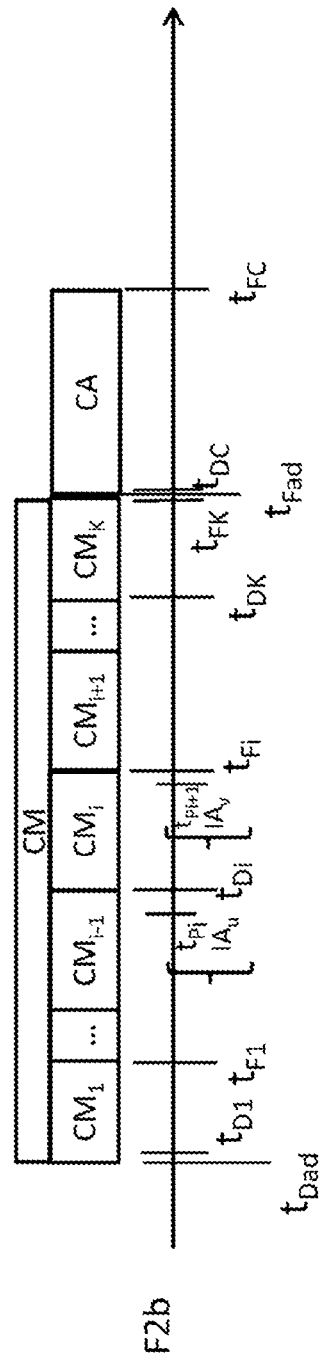
Figure 7C:
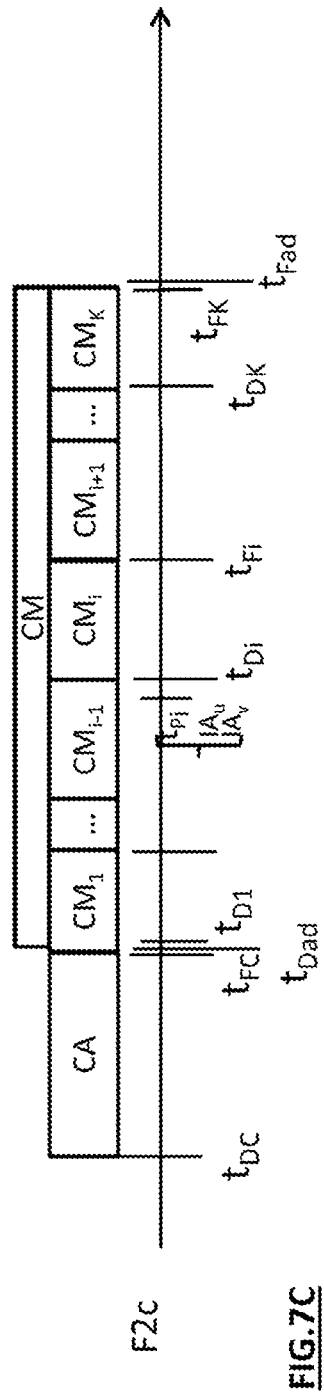
Figure 8A:
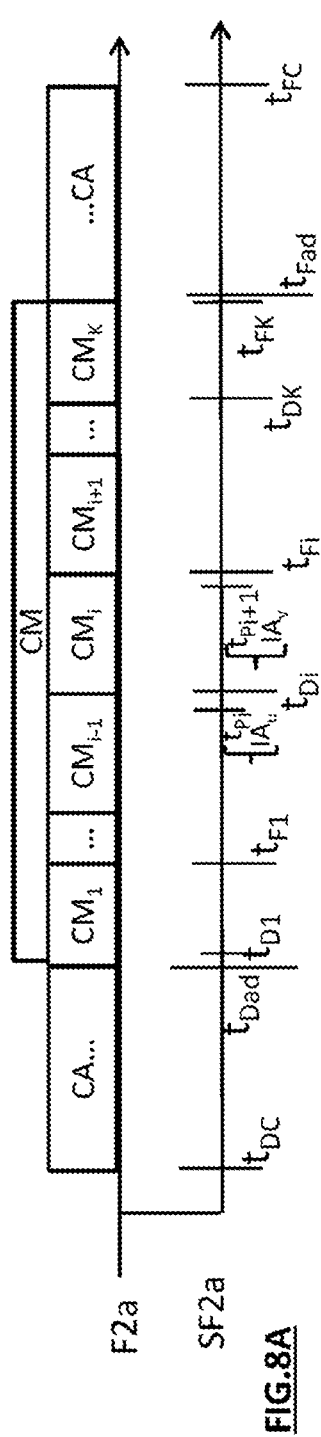
Figure 8B:
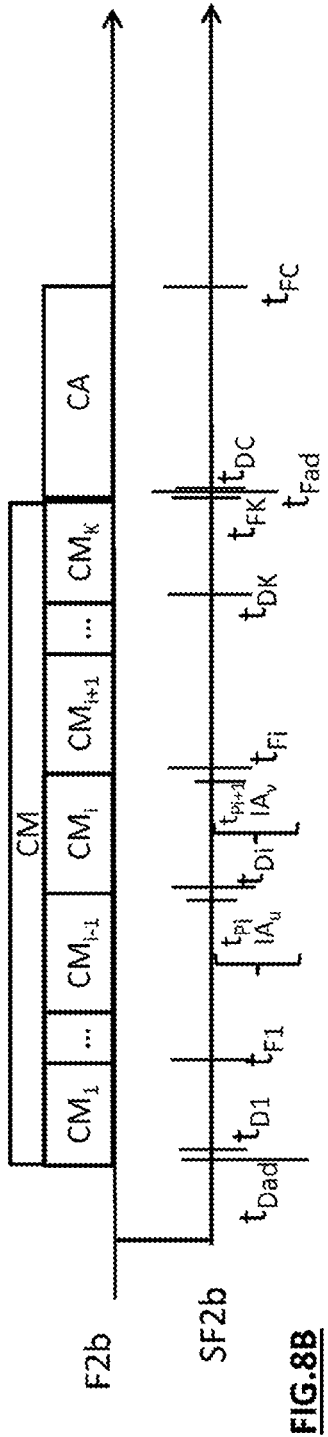
Figure 8C:
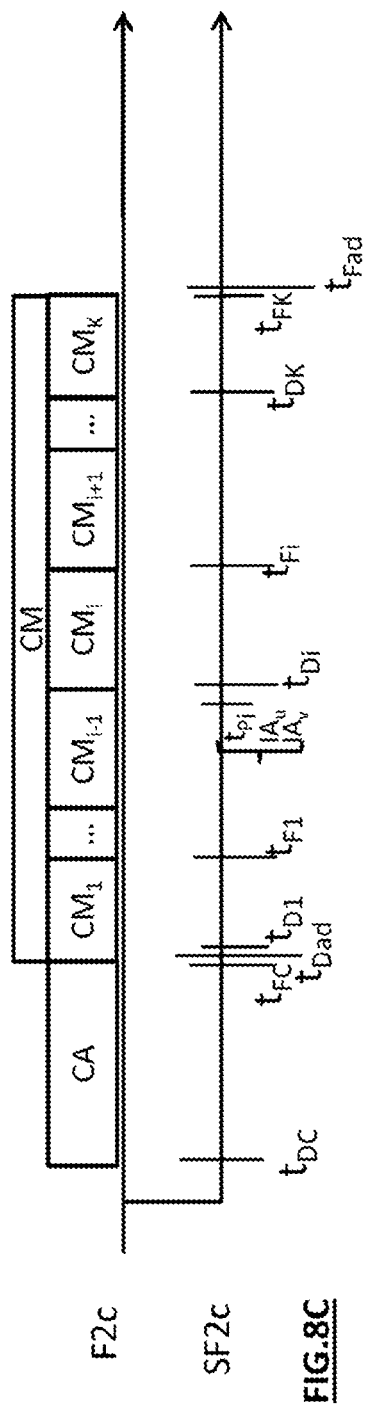
Figure 9A:
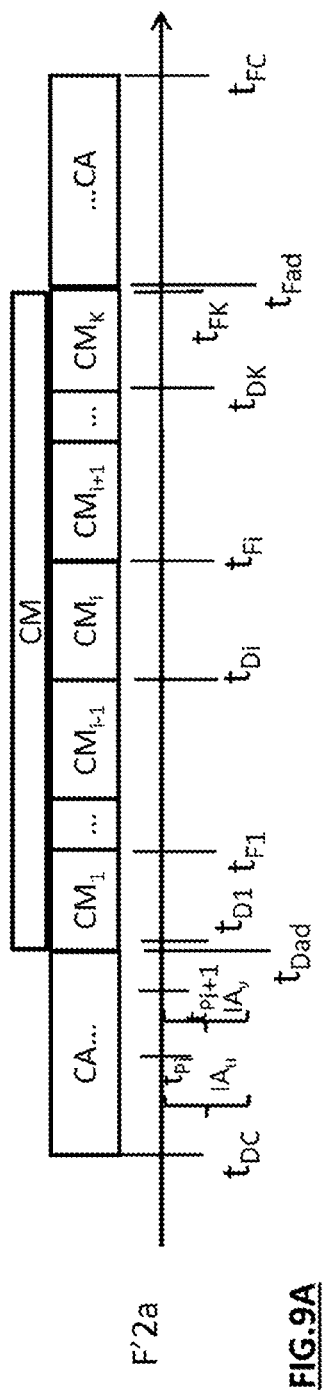
Figure 9B:
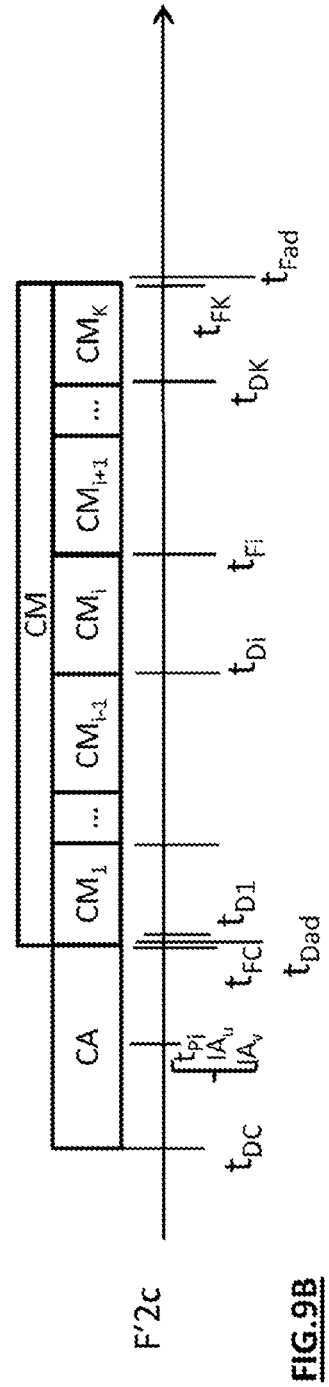
Figure 10:
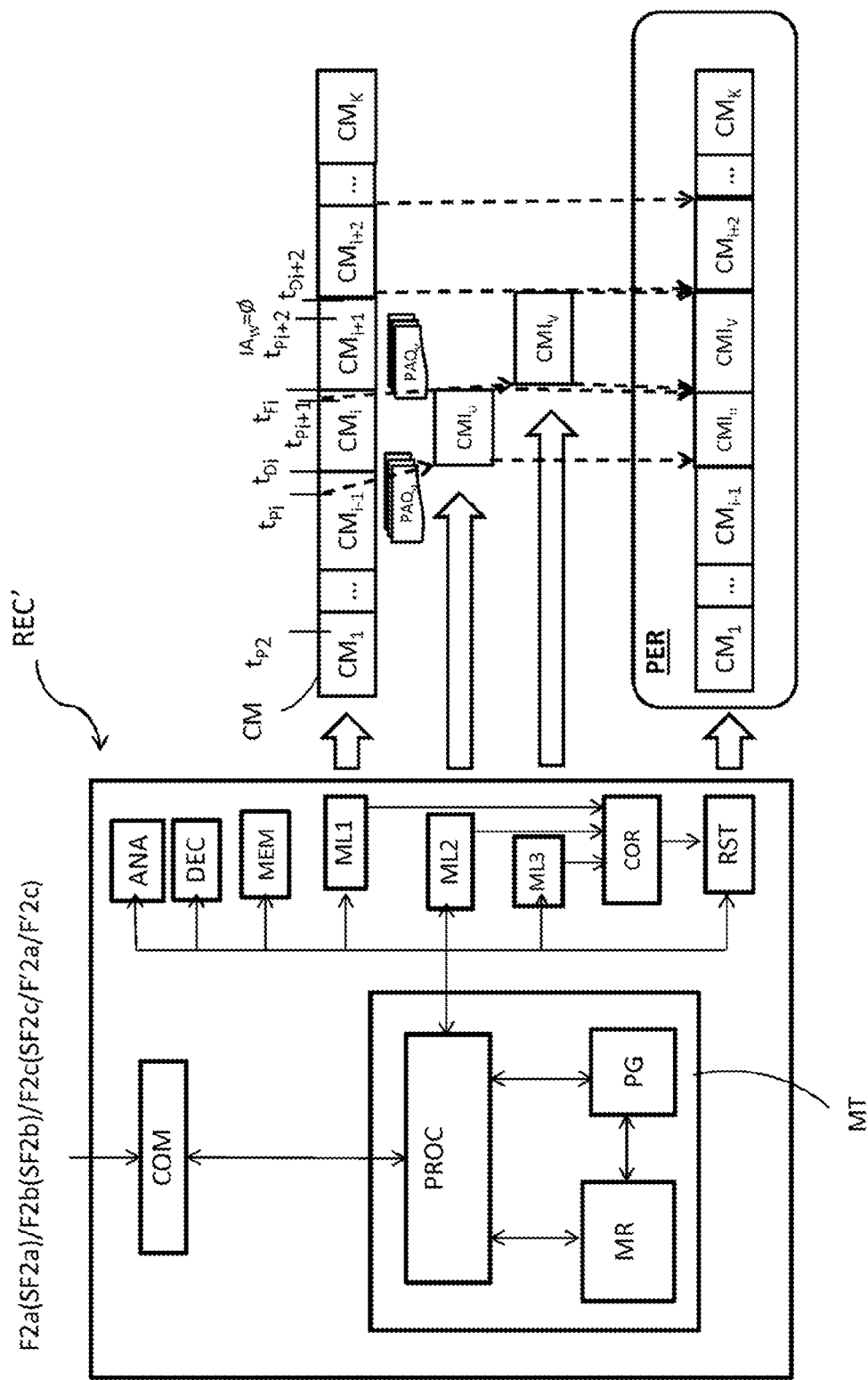

FIG. 5 schematically shows the progress of a flow reception method according to the first embodiment of the invention;

FIGS. 6A to 6D show examples of modifying the rendering of a given portion of an item of multimedia content;

FIGS. 7A to 7C show three examples of a first type of flow structure according to a second embodiment;

FIGS. 8A to 8C show three examples of a second type of flow structure according to a second embodiment;

FIGS. 9A and 9B show variant embodiments of the flows shown in FIGS. 7A and 7C;

FIG. 10 shows a reception device implementing the flow reception method according to the second embodiment of the invention;

FIG. 11 schematically shows the progress of a flow reception method according to the second embodiment of the invention.

DESCRIPTION OF PARTICULAR EMBODIMENTS OF THE INVENTION

Figure 1A:
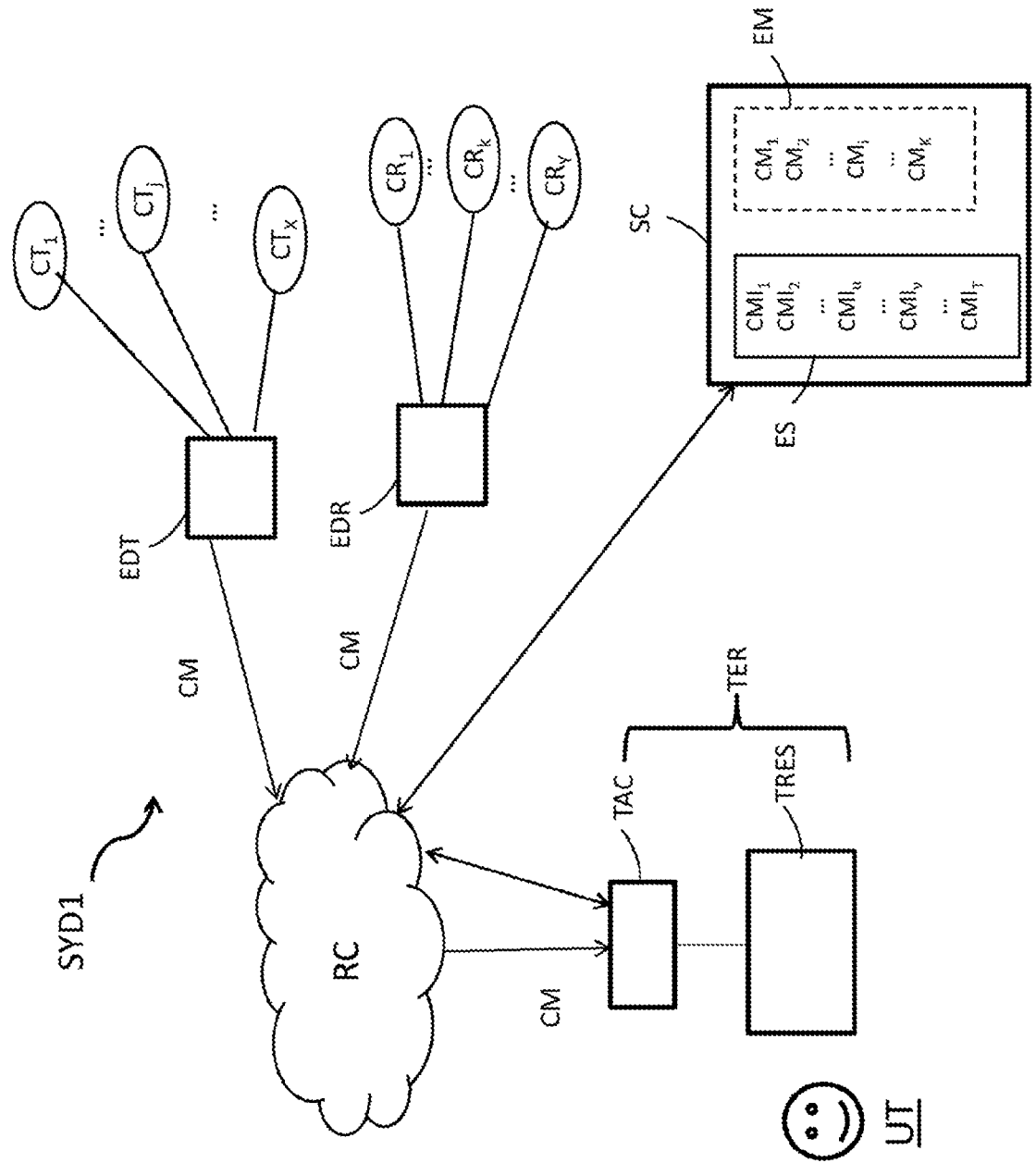

First Embodiment—Substitution of at Least Two Successive Portions of an Item of Multimedia Content With reference to FIG. 1A, a broadcast system SYD1 for broadcasting a flow representative of an item of multimedia content CM is shown according to a first embodiment. In the example of FIG. 1A, the item of multimedia content CM is in particular:

a television program offered by a television channel $CT_j$ chosen from among a plurality of existing television channels $CT_1, CT_2, CT_j, \ldots, CT_X$, a radio program offered by a radio station $CR_k$ chosen from among a plurality of existing radio stations $CR_1, CR_2, \ldots, CR_k, \ldots, CR_Y$.

The item of television multimedia content CM is broadcast live by broadcast equipment EDT, whereas the item of radio multimedia content CM is broadcast live by broadcast equipment EDR.

As is known, such flows are broadcast by way of example through the air (for example radio waves or satellite) using the "broadcast" technique or else by way of an Internet hardware network (for example cable or fiber), using the multicast or unicast technique.

The abovementioned architecture allows the user UT of a terminal TER to have access to the television programs or radio programs that are offered, both in a mobility situation and in a stationary situation, via a communication network RC.

In a mobility situation, the terminal TER is for example a mobile telephone, a smartphone, a tablet, a portable computer, etc.

In a stationary situation, the terminal TER could be a personal computer or PC.

Still in a stationary situation, and as shown in FIG. 1A, the terminal TER consists for example:

of an access terminal TAC that is able to receive and process the broadcast flows from the broadcast equipment EDT or EDR, of a rendering terminal TRES able to render the programs processed by the access terminal TAC to the user UT.

In one exemplary embodiment, the access terminal TAC and the rendering terminal TRES are grouped together in a single terminal. This could be for example a television containing a set-top-box decoder. In another example, the access terminal TAC is an Internet connection module and the rendering terminal TRES is a tablet acting as a rendering terminal and connected to the module by way of a local area network, for example a wireless one, in particular of Wi-Fi or PLC (abbreviation for "power line communication") type. According to another example, the access terminal TAC is an Internet connection module and the rendering terminal is a radio set connected to this module by way of a local area network, for example a wireless one, in particular of Wi-Fi or PLC type.

The access terminal TAC is also provided with means for storing items of multimedia content, in particular television programs or radio programs that are broadcast via the network RC. Alternatively, it may also be connected to an external multimedia content recording module.

The user UT may interact with the access terminal TAC using a conventional remote controller or using a terminal that comprises a suitable remote controller software application for this purpose. The access terminal TAC, as well as the terminal TER, furthermore comprise means for connecting to the communication network RC, which may be, for example, of x-DSL, fiber or else 3G, 4G or 5G type.

Figure 1B:
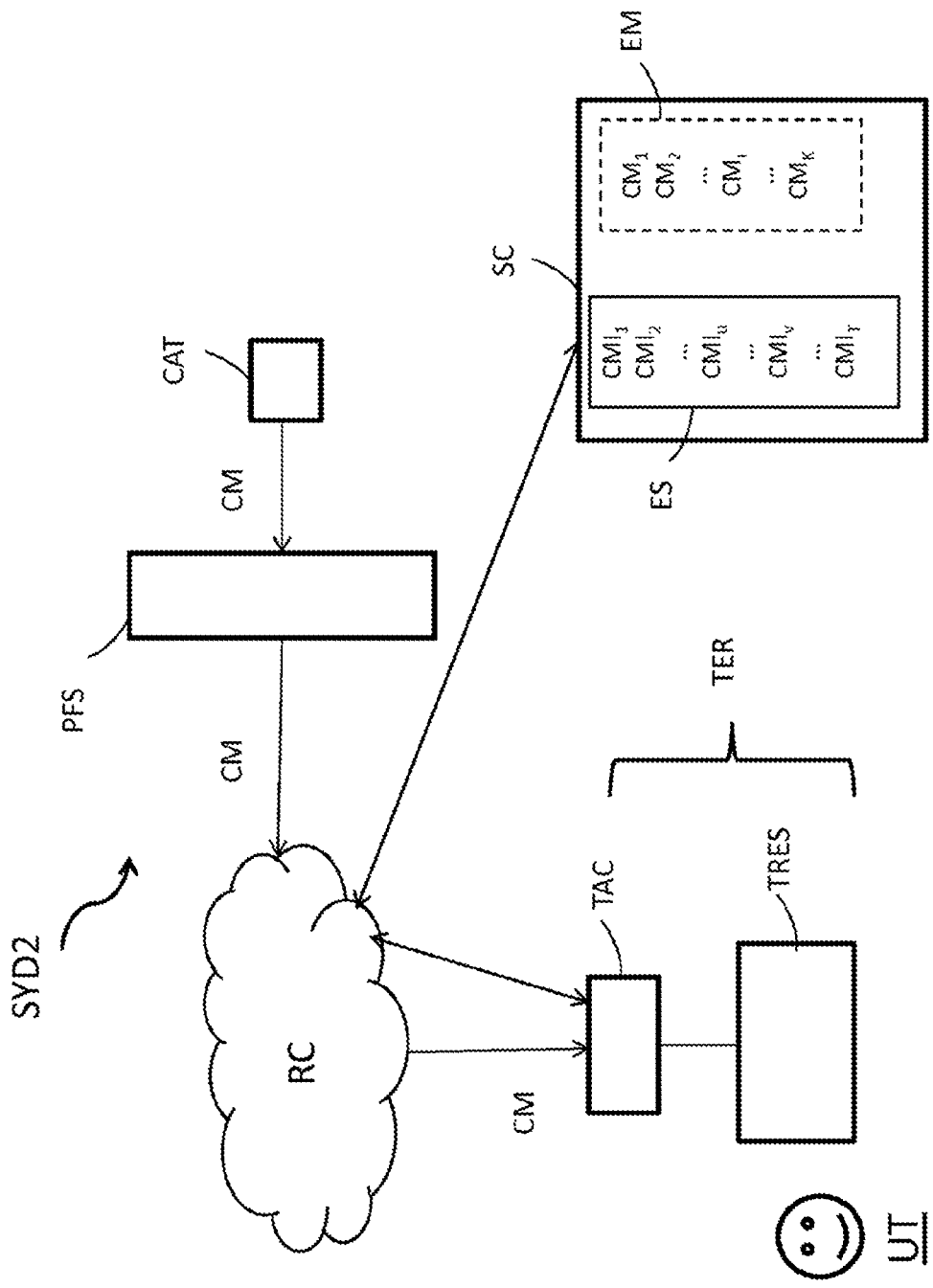

With reference to FIG. 1B, a broadcast system SYD2 for broadcasting a flow representative of an item of multimedia content CM is shown according to a second embodiment. The broadcast system SYD2 of FIG. 1B has elements in common with the broadcast system SYD1 of FIG. 1A. For this reason, these elements are represented by the same reference numbers and will not be described again. In the example of FIG. 1B, the item of multimedia content CM is selected by the user UT from a content catalog CAT, such as for example a VoD catalog, an audiovisual or audio only podcast catalog, a video and/or image and/or photo catalog, a music catalog, a digital book catalog, etc.

The item of multimedia content CM is then transmitted in a flow by a service platform PFS, said flow being received by the access terminal TAC.

Figure 2A:
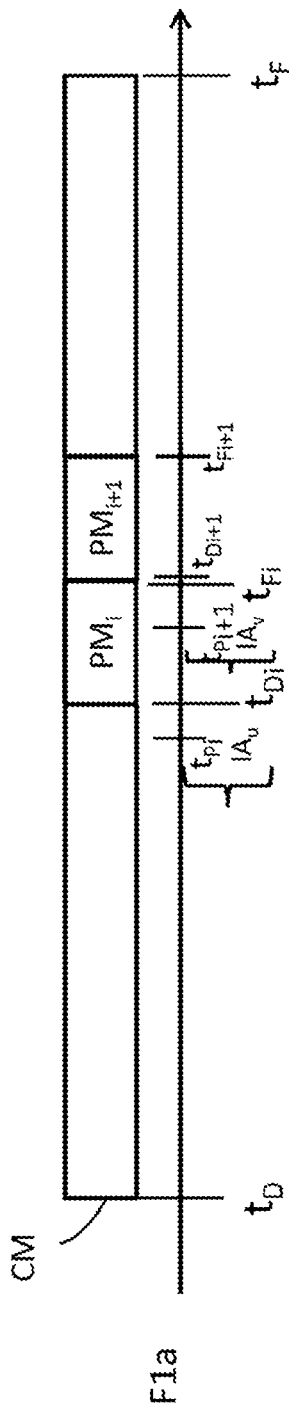
FIGS. 2A and 2B show two examples of a first type of flow structure according to a first embodiment.

With reference to FIG. 2A, a first embodiment of a flow F1a representative of an item of multimedia content CM is shown.

The flow F1a contains a time marker $t_D$ for the start of the item of content CM and a time marker $t_F$ for the end of the item of content CM.

The flow F1a also contains at least two predefined portions $PM_i$ and $PM_{i+1}$ that follow one another in the item of content CM. Each portion is associated with a time segment of the flow F1a and to this end comprises a start time and an end time for the portion. The portions $PM_i$ and $PM_{i+1}$ may be segments of equal or unequal duration.

More particularly, the flow F1a is edited beforehand so as to contain:

a time marker for the start $t_{Di}$, respectively for the end $t_{Fi}$, of the content portion $PM_i$, a time marker for the start $t_{Di+1}$, respectively for the end $t_{Fi+1}$, of the content portion $PM_{i+1}$.

In the example of FIG. 2A, the time markers are signaled directly in the flow F1a, that is to say in-band.

According to one embodiment, the abovementioned time markers are tags, such as for example SCTE 104/35 tags.

Figure 3A:
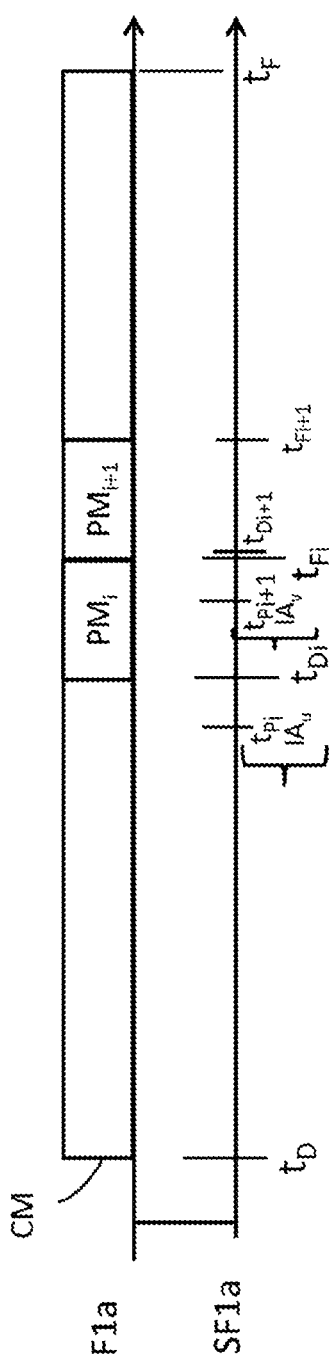
FIGS. 3A and 3B show two examples of a second type of flow structure according to the first embodiment.

According to another embodiment shown in connection with FIG. 3A, the abovementioned time markers are indicated in a signaling subflow SF1a associated with the flow F1a.

The signaling of the time markers is transmitted in the communication network RC (FIG. 1A or 1B) and not directly in the flow that contains the item of multimedia content CM. This is in this case out-band signaling.

The subflow SF1a contains information allowing the flow F1a to be analyzed by the access terminal TAC of the user shown in FIGS. 1A and 1B.

According to the invention, and as will be described in more detail in the description below, it is proposed to modify, on the fly in the flow F1a, the rendering of at least two successive portions $PM_i$, $PM_{i+1}$ of the item of multimedia content CM by respectively rendering at least two substitute items of multimedia content $CMI_u$, $CMI_v$ that are or are not tailored to the interests of the user UT of the terminal TER of FIGS. 1A and 1B. In the remainder of the description, the substitute items of content possibly tailored to the interests of the user UT will be called items of content of interest. The items of content of interest $CMI_u$, $CMI_v$ form part of a set ES of predetermined items of multimedia content $CMI_1$, $CMI_2$, . . . , $CMI_u$, . . . , $CMI_v$, . . . , $CMI_T$, where 1≤u≤v≤T. The set ES is stored in a content server SC.

According to the invention, with reference to FIG. 2A, the flow F1a is edited so as to contain:
  at a predetermined time $t_{Pi}$ before the start of the portion $PM_i$, an item of access information $IA_u$ for accessing the item of multimedia content of interest $CMI_u$,
  at a predetermined time $t_{Pi+1}$ before the start of the portion $PM_{i+1}$, an item of access information $IA_v$ for accessing the item of multimedia content of interest $CMI_v$.

Figure 2B:
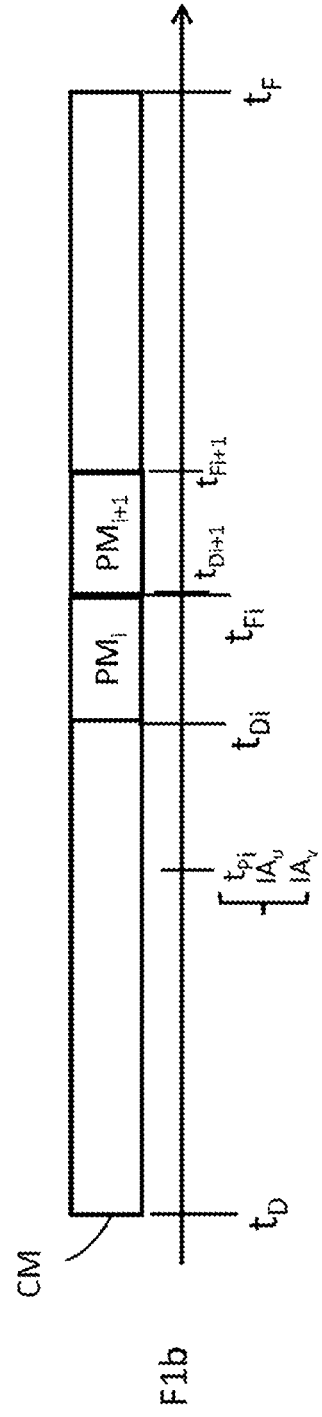

According to another example shown with reference to FIG. 2B, the flow F1b contains, at a predetermined time $t_{Pi}$ before the start of the portion $PM_i$, an item of access information $IA_u$ for accessing the item of multimedia content of interest $CMI_u$ and an item of access information $IA_v$ for accessing the item of multimedia content of interest $CMI_v$.

Figure 3B:
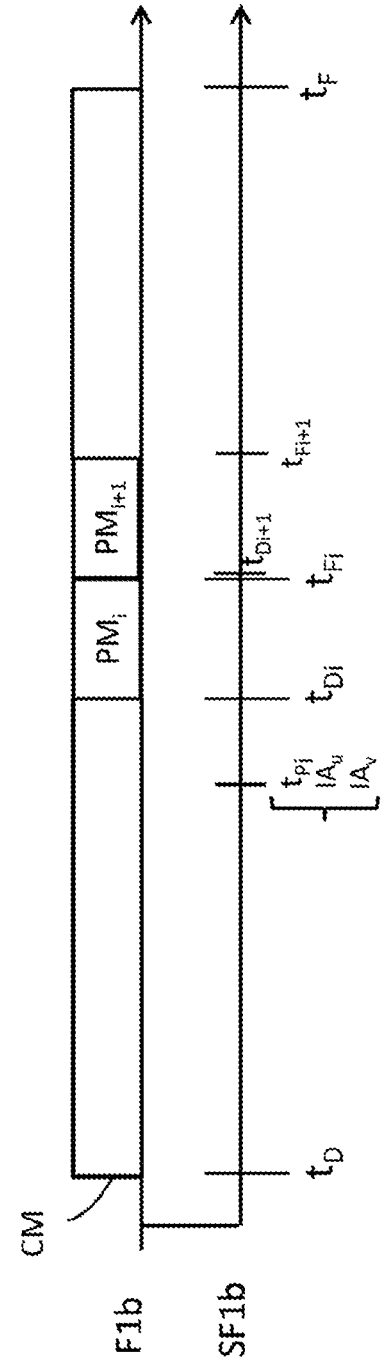

With reference to FIG. 3B, according to a variant of the embodiment of FIG. 3A, a flow F1b associated with a signaling subflow SF1b is shown, the subflow SF1b containing, at a predetermined time $t_{Pi}$ before the start of the portion $PM_i$, an item of access information $IA_u$ for accessing the item of multimedia content of interest $CMI_u$ and an item of access information $IA_v$ for accessing the item of multimedia content of interest $CMI_v$.

If the predetermined times $t_{Pi}$ and $t_{Pi+1}$ are marked in time by two SCTE 104/35 tags:
  with reference to FIG. 2A, the SCTE 104/35 tag at the predetermined time $t_{Pi}$ comprises a data field containing the item of access information $IA_u$ and the SCTE 104/35 tag at the predetermined time $t_{Pi+1}$ comprises a data field containing the item of access information $IA_v$;
  with reference to FIG. 2B, the SCTE 104/35 tag at the predetermined time $t_{Pi}$ comprises a data field containing the item of access information $IA_u$ and the item of access information $IA_v$.

If the predetermined times $t_{Pi}$ and $t_{Pi+1}$ are entered in the signaling subflows SF1a and SF1b of FIGS. 3A and 3B:
  with reference to FIG. 3A, the signaling subflow SF1a contains a data field associating the predetermined time $t_{Pi}$ with the item of access information $IA_u$ and a data field associating the predetermined time $t_{Pi+1}$ with the item of access information $IA_v$,
  with reference to FIG. 3B, the signaling subflow SF1b contains a data field associating the predetermined time $t_{Pi}$ with the item of access information $IA_u$ and with the item of access information $IA_v$.

According to variant embodiments in FIGS. 2A, 2B, 3A and 3B, if the flows F1a, F1b, F2a, F2b are broadcast by a given television channel, for example the television channel $CT_j$ in FIG. 1A, or by a given radio station, for example the radio station $CR_k$ in FIG. 1A, the flows F1a and F1b in FIGS. 2A and 2B and the subflows SF1a and SF1b in FIGS. 3A and 3B each contain time markers associated with items of access information for accessing the items of content of interest intended to modify the rendering of portions present in items of content broadcast on a channel or station other than the channel or station $CT_j$ or $CR_k$.

According to the invention, the item of access information $IA_u$ (respectively $IA_v$) is, by way of non-exhaustive example:
  an instruction addressed to the access terminal TAC (FIGS. 1A and 1B) so that the latter determines, for a portion of the current item of multimedia content CM under consideration to be read, for example the portion $PM_i$, whether the rendering of the portion $PM_i$ should or should not be modified by the rendering of an item of content of interest selected from the set ES of items of content of interest from FIGS. 1A and 1B,
  an item of information deduced from an item of information corresponding to the portion $PM_i$, such as for example an item of metadata, a word intended to be spoken or displayed during the rendering of the portion $PM_i$, etc.,
  an identifier of an item of multimedia content of interest, such as for example the name of the file containing this item of multimedia content of interest,
  an access address, for example a URL ("Uniform Resource Locator"), for accessing, via a communication network, for example the network RC in FIGS. 1A and 1B, an item of content of interest from the set ES of items of content of interest $CMI_1$, $CMI_2$, . . . , $CMI_u$, . . . , $CMI_v$, . . . , $CMI_T$,
  at least one item of user profile information, such as for example one or more district identifiers, an age or an age range, the value of an income or an income range, a duration of watching television in hours per day, etc.

Figure 4:
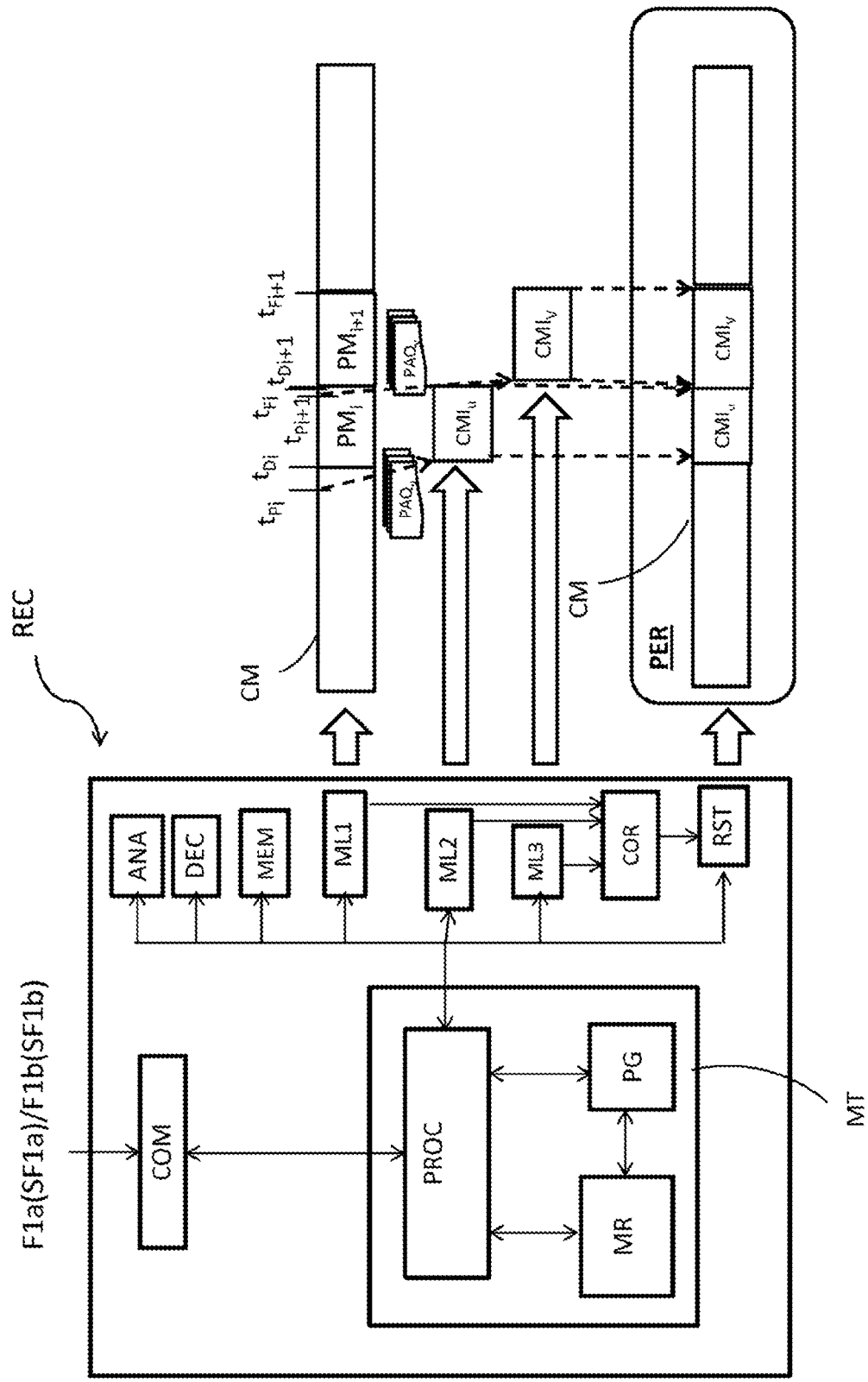
FIG. 4 shows a reception device implementing the flow reception method according to the first embodiment of the invention.

With reference to FIG. 4, according to a first embodiment, consideration is now given to the simplified structure of a reception device REC for receiving flow representative of an item of multimedia content CM. Such a device is contained in the access terminal TAC of FIGS. 1A and 1B, according to one exemplary embodiment of the invention. Such a flow reception device is designed to implement the flow reception method according to the invention that will be described below with reference to FIG. 5.

In a manner known per se, the reception device REC comprises:
  a communication module COM that is designed to communicate, via the communication network RC, in accordance for example with the http (abbreviation for "HyperText Transfer Protocol") protocol, with the broadcasting equipment EDT and EDR of FIG. 1A or with the service platform PFS of FIG. 1B,
  an analysis module ANA for analyzing the received flows,
  a first reading module ML1 for reading the item of multimedia content CM contained in the flow,
  a decoding module DEC for the audio, video or else audio/video decoding of the data of the item of multimedia content CM, said data possibly being of text and/or audio and/or image and/or video and/or audiovisual type,
  a memory MEM for storing data, such as for example a buffer memory.

The reception device REC comprises hardware and/or software resources, in particular a processing module MT for implementing the flow reception method of FIG. 5.

The processing module MT contains a processor PROC driven by a computer program PG.

On initialization, the code instructions of the computer program PG are for example loaded into a RAM memory, denoted MR, before being executed by the processing module MT.

According to the invention, for at least first and second predefined successive portions $CM_i$, $CM_{i+1}$ of the item of multimedia content CM, the reception device REC comprises:
- a second reading module ML2 for reading a first item of multimedia content of interest $CMI_u$ in parallel with the reading of the item of multimedia content CM by the first reading module ML1, the reading module ML2 being driven by the processor PROC of the processing module MT,
- a third reading module ML3 for reading a second item of multimedia content of interest $CMI_v$ in parallel with the reading of the item of multimedia content CM by the first reading module ML1, the reading module ML3 being driven by the processor PROC of the processing module MT,
- the rendering module RST renders the item of audiovisual content CA and the item of multimedia content CM read on the peripheral device PER,
- a rendering control module COR commands the rendering, by the rendering module RST,
    - either of the item of multimedia content CM or portions thereof, read by the reading module ML1, taking into account the markup information indicated in the received flow and the item and/or items of access information associated with this markup information,
    - or of each item of content of interest read by the reading module ML2 (respectively ML3), instead of or in addition to the rendering of a given portion $PM_i$ (respectively $PM_{i+1}$) of the current item of multimedia content CM, taking into account the markup information indicated in the received flow and the item and/or items of access information associated with this markup information.

A first embodiment of the flow reception method according to the invention is now described with reference to FIG. 5. Such a method takes place as follows:

At S1, the communication module COM of FIG. 9 receives a flow of the type shown in FIGS. 2A to 2B and 3A to 3B. As already explained above in the description, such a flow is representative of an item of multimedia content CM.

At S2, the analysis module ANA of FIG. 4 then reads the various time markers inserted into the flow.

At S3, following the reading of the time marker $t_D$ indicating the start of the item of multimedia content CM, the processing module MT activates the first reading module ML1 in order to read the data of the item of multimedia content CM.

At S4, the rendering module RST renders the item of multimedia content CM on the peripheral device PER of FIG. 4, as the item of multimedia content CM is read at S3.

At S5, at a predetermined time $t_{Pi}$ before the start time $t_{Di}$ of a predefined portion $PM_i$ of the item of content CM, the analysis module ANA determines that the rendering of the portion $PM_i$ should be modified by rendering an item of multimedia content of interest $CMI_u$ over the duration $t_{Fi}-t_{Di}$ of the portion $PM_i$ or over part of this duration.

To this end, the analysis module ANA reads an item of access information $IA_u$ for accessing said item of multimedia content of interest $CMI_u$ from the flow F1a (respectively F1b, SF1a, SF1b).

At S6, the processing module MT activates the second reading module ML2 so that the latter loads the first data packets $PAQ_u$ relating to the item of multimedia content of interest $CMI_u$, before the start time $t_{Di}$ of the portion $PM_i$.

At S7, at the start time $t_{Di}$ of the portion $PM_i$, the second reading module ML2 reads the item of content of interest $CMI_u$.

At S8, at the start time $t_{Di}$ of the portion $PM_i$, the rendering control module COR of FIG. 4 then commands the rendering of the item of multimedia content $CMI_u$ instead of or in addition to the rendering of the portion $PM_i$ of the item of multimedia content CM that is currently being read by the first reading module ML1. As shown in FIG. 4, the rendering of the item of multimedia content of interest $CMI_u$ is implemented exactly between the start time $t_{Di}$ and the end time $t_{Fi}$ of the portion $PM_i$, such that the user UT does not perceive the modification of the rendering of the item of multimedia content CM that is implemented, advantageously, without a break in the flow.

Moreover, no latency phenomenon is caused at the time $t_{Di}$ when the second reading module ML2 starts to read the item of content of interest $CMI_u$, since the reading module ML2 already had the first data packets $PAQ_u$ of the item of content of interest $CMI_u$, as obtained at S6.

At S9, at a predetermined time $t_{Pi+1}$ before the time $t_{Di+1}$ of the portion $PM_{i+1}$ that directly follows the portion $PM_i$ in the item of multimedia content CM, and while the second reading module ML2 is still currently reading the item of multimedia content of interest $CMI_u$ and the module COR commands the rendering thereof synchronously, the analysis module ANA determines that the rendering of the portion $PM_{i+1}$ should be modified by rendering an item of multimedia content of interest $CMI_v$ over the duration $t_{Fi+1}-t_{Di+1}$ of the portion $PM_{i+1}$ or over part of this duration.

To this end, the analysis module ANA reads an item of access information $IA_v$ for accessing said item of multimedia content of interest $CMI_v$ from the flow F1a (respectively F1b, SF1a, SF1b).

At S10, the processing module MT activates the third reading module ML3 so that the latter loads the first data packets $PAQ_v$ relating to the item of multimedia content of interest $CMI_v$, before the start time $t_{Di+1}$ of the portion $PM_{i+1}$.

At S11, at the start time $t_{Di+1}$ of the portion $PM_{i+1}$, the processing module MT deactivates the second reading module ML2, the third reading module ML3 then reading the item of multimedia content of interest $CMI_v$.

At S12, at the start time $t_{Di+1}$ of the portion $PM_{i+1}$, the rendering control module COR of FIG. 4 then commands the rendering of the item of multimedia content of interest $CMI_v$ instead of or in addition to the rendering of the portion $PM_{i+1}$ of the item of multimedia content CM that is currently being read by the first reading module ML1. As shown in FIG. 4, the rendering of the item of multimedia content of interest $CMI_v$ is implemented exactly between the start time $t_{Di+1}$ and the end time $t_{Fi+1}$ of the portion $PM_{i+1}$, such that the user UT does not perceive the modification of the rendering of the item of multimedia content CM that is implemented, without a break in the flow.

No latency phenomenon is caused between the time $t_{Fi}$ when the second reading module ML2 finishes reading the item of content of interest $CMI_u$ and the time $t_{Di+1}$ when the third reading module ML3 starts to read the item of content of interest $CMI_v$, since the reading module ML3 already had the first data packets $PAQ_v$ of the item of content of interest $CMI_v$, as obtained at S10.

As an alternative to the method that has just been described above, operations S6 and S10 are carried out together, at the predetermined time $t_{Pi}$ before the start time $t_{Di}$ of the portion $PM_i$ under consideration in the item of content CM, thereby making it possible to anticipate the preloading of the data of the item of content of interest $CMI_v$ to an even greater extent.

By virtue of the flow reception method that has just been described, it is thus possible to replace, on the fly, the rendering of at least two successive portions in the item of multimedia content, by respectively rendering two substitute items of multimedia content that may match the interests of the user UT.

Of course, it may be contemplated to modify the rendering of more than two successive portions present in the item of multimedia content CM. Thus, for example, the reading modules ML2 and ML3 will again be activated respectively if the processing module MT determines that for example the rendering of the successive portions $PM_{i+2}$, $PM_{i+3}$, and then $PM_{i+5}$, $PM_{i+6}$ should be modified.

The interests of the user UT comprise at least one criterion CRT for characterizing the user according to various aspects, such as for example geographical, social, demographic, matrimonial, etc. aspects. Each criterion CRT is moreover known in advance by the broadcast equipment EDT and EDR of FIG. 1A and by the service platform PFS of FIG. 1B. Such criteria CRT comprise for example:
- the district identifier of the town in which the user UT lives, and/or
- the name of the road on which the user UT lives, and/or
- the age of the user UT, and/or
- the nationality of the user UT, and/or
- the annual income of the user UT, and/or
- the status of the user UT, for example married, single, childless, large household, student, executive, employee, and/or
- the type of subscription to which the user UT has subscribed, and/or
- one or more time slots during which the user UT watches television,
- etc.

According to one preferred embodiment, the items of content of interest $CMI_u$ and $CMI_v$ accessed respectively via the items of access information $IA_u$ and $IA_v$ are downloaded into the memory MEM of the reception device REC, prior to the start time $t_{Di}$ of the portion $PM_i$ and to the start time $t_{Di+1}$ of the portion $PM_{i+1}$, in the form of respective files, for example:
- of mp4 type and having for example the names "spotu.mp4" and "spotv.mp4",
- of mp3 type and having for example the names "spotu.mp3" and "spotv.mp3",
- of jpeg type and having for example the names "spotu.jpg" and "spotv.jpg".

Each item of content of interest $CMI_u$ and $CMI_v$ is downloaded from the content server SC of FIGS. 1A and 1B, following the reception of a request from the reception device REC, said request containing:
- one and/or more items of criteria information CRT of the user UT, as mentioned above,
- an identifier of the reception device REC,
- an identifier IPM associated with the portion $PM_i$ (respectively $PM_{i+1}$).

According to this preferred embodiment, the items of access information $IA_u$, $IA_v$ read by the analysis module ANA are for example identifiers of the items of content of interest $CMI_u$, $CMI_v$, such as for example the names of the files "spotu.mp4", "spotv.mp4", "spotu.mp3", "spotv.mp3", "spotu.jpg" and "spotv.jpg" mentioned above.

According to another embodiment, with reference to FIGS. 1A, 1B and 4, if for example the user UT switches on his terminal TER just before the reading of the portion $PM_i$ (respectively $PM_{i+1}$), the items of access information $IA_u$, $IA_v$ read by the analysis module ANA are URL links allowing the reception device REC to respectively access the items of content of interest $CMI_u$, $CMI_v$ stored in the content server SC of FIGS. 1A and 1B, so that they are read directly by the reading modules ML2 and ML3, respectively. Each URL is contained in a request from the reception device REC, said request containing:
- one and/or more items of criteria information CRT of the user UT, as mentioned above,
- an identifier of the reception device REC,
- an identifier IPM associated with the portion $PM_i$ (respectively $PM_{i+1}$).

As a variant of this other embodiment and with reference to FIGS. 3A to 3B, the items of access information $IA_u$, $IA_v$ read by the analysis module ANA are flow pointers allowing the reception device REC to access the items of content of interest $CMI_u$, $CMI_v$ directly from the subflows SF1a and SF1b.

According to another embodiment, and with reference to FIGS. 1A, 1B and 4, each item of access information $IA_u$, $IA_v$ contains at least one item of user profile information, such as for example one or more district identifiers, an age or an age range, the value of an annual income or an annual income range, a duration of watching television in hours per day, etc. Following the reading of each item of access information $IA_u$, $IA_v$ by the analysis module ANA, the processing module MT of the reception device REC checks whether said at least one item of profile information corresponds to at least one criterion CRT of the user UT. If this is the case, the rendering of the portions $PM_i$, $PM_{i+1}$ is modified by respectively rendering the items of multimedia content of interest $CMI_u$, $CMI_v$. If this is not the case, the reading modules ML2 and ML3 are not activated and the first reading module ML1 conventionally reads the portions $PM_i$, $PM_{i+1}$, the successive rendering of which on the device PER of FIG. 4 is implemented by the rendering module RST.

According to yet another embodiment, each item of access information $IA_u$, $IA_v$ is an instruction transmitted to the processing module MT of FIG. 4, which determines, for a given portion $PM_i$, whether or not to modify the rendering of this portion with a specific item of content of interest, on the basis of various criteria that may be linked to the subscription of the user UT, to the capacities of the reception device REC, to the bandwidth evaluated at the predetermined time $t_{Pi}$, before the start of the portion $PM_i$.

A description will now be given, with reference to FIGS. 6A to 6D, of various possible configurations for modifying the rendering of a given portion of the item of multimedia content CM. The given portion is for example the portion $PM_i$.

Figure 6B:
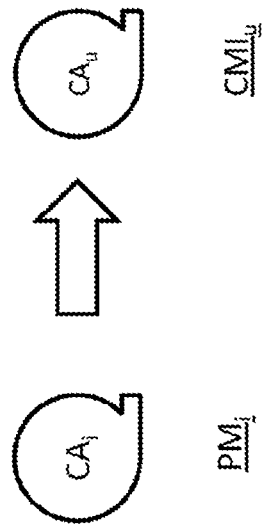
Figure 6D:
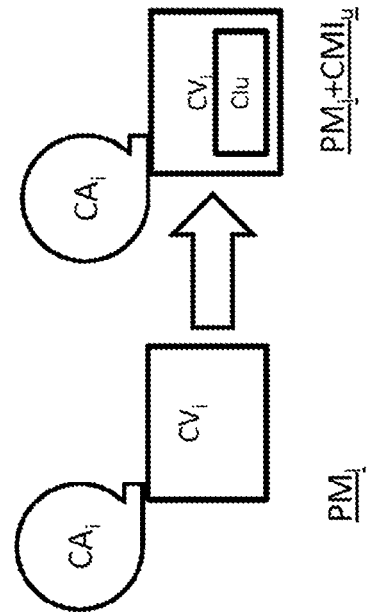
Figure 6A:
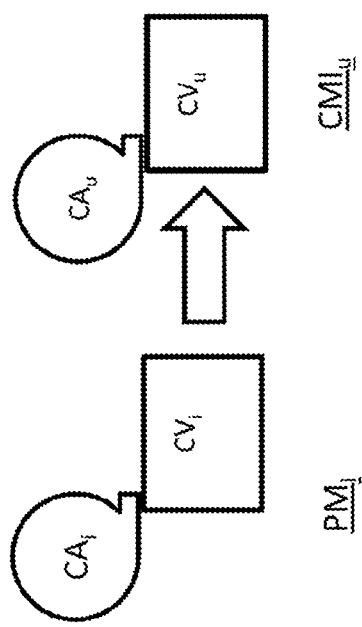

In the example of FIG. 6A, the portion $PM_i$ is of audiovisual type and to this end comprises an audio component $CA_i$ and a video component $CV_i$. Modifying the rendering of the portion $PM_i$ then consists in substituting the rendering of the portion $PM_i$ with the rendering of an item of content of interest $CMI_u$ that is also of audiovisual type, to this end comprising an audio component $CA_u$ and a video component $CV_u$.

In the example of FIG. 6B, the portion $PM_i$ is of audio type and to this end comprises an audio component $CA_i$. Modifying the rendering of the portion $PM_i$ then consists in substituting the rendering of the portion $PM_i$ with the rendering of an item of content of interest $CMI_u$ that is also of audio type, to this end comprising an audio component $CA_u$.

Figure 6C:
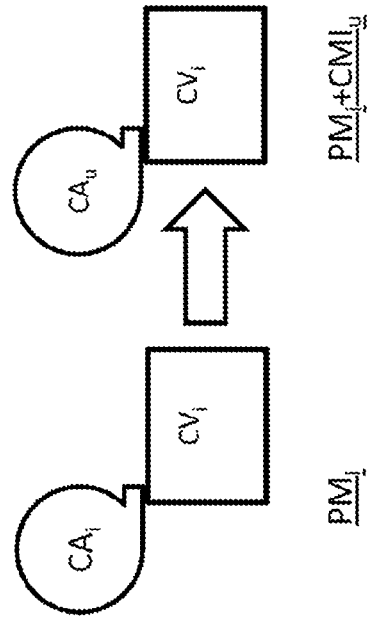

In the example of FIG. 6C, the portion $PM_i$ is of audiovisual type and to this end comprises an audio component $CA_i$ and a video component $CV_i$. Modifying the rendering of the portion $PM_i$ then consists in substituting only the rendering of the audio component $CA_i$ of the portion $PM_i$ with the rendering of an item of content of interest $CMI_u$ that is also only of audio type, to this end comprising an audio component $CA_u$. If for example the portion $PM_i$ of the item of multimedia content is the crucial part of a film rendered in a language that is not that of the user UT, the audio component $CA_u$ of the item of content of interest $CMI_u$ that is rendered is in the native language of the user UT.

In the example of FIG. 6D, the portion $PM_i$ is of audiovisual type and to this end comprises an audio component $CA_i$ and a video component $CV_i$. Modifying the rendering of the portion $PM_i$ then consists in adding the rendering of an item of content of interest $CMI_u$ during the rendering of the portion $PM_i$. The item of content of interest $CMI_u$ is for example of image type, to this end comprising an image component $CI_u$ that appears in superimposed form during the rendering of the portion $CM_i$ or during only part of this rendering, at a predetermined location on the screen forming the peripheral device PER of FIG. 4. According to one example, in the case where the user is called Mr. Dupont, the item of content of interest $CMI_u$ could in this example be a banner containing advertising text addressed specifically to the user UT, Mr. Dupont, entitled for example: "Mr. Dupont, a new supermarket has just opened 50 m from your street!".

Second Embodiment—Substitution of a Plurality of Successive Items of Multimedia Content into an Item of Multimedia Content CM (for Example Advertising Break)

With reference to FIG. 7A, a second embodiment of a flow F2a representative of an item of multimedia content CM is shown. According to one example, the item of multimedia content CM is an advertising break containing several successive items of multimedia content $CM_1, \ldots, CM_i, \ldots CM_K$ ($1 \le i \le K$). The advertising break is associated with an item of audiovisual content CA in the flow F2a. Such an item of audiovisual content CA is of audio type or video type or else of audio and video type.

The successive items of multimedia content $CM_1, \ldots, CM_i, \ldots CM_K$ belong to a set EM stored in the content server SC of FIGS. 1A and 1B and are edited beforehand by a content provider to which the server SC belongs, in order to be able to be played one after the other over the duration $t_{Fad} - t_{Dad}$ of the item of multimedia content CM. According to another example, the set EM could be stored in a content server other than the server SC.

The flow F2a contains a time marker $t_{DC}$ for the start of the item of content CA and a time marker $t_{FC}$ for the end of the item of content CA. The flow F2a also contains:

a time marker for the start $t_{Di}$, respectively for the end $t_{Fi}$, of the item of multimedia content $CM_i$,

. . . , a time marker for the start $t_{Di}$, respectively for the end $t_{Fi}$, of the item of multimedia content $CM_i$,

. . . , a time marker for the start $t_{DK}$, respectively for the end $t_{FK}$, of the item of multimedia content $CM_K$.

In the example of FIG. 7A, the item of multimedia content CM interrupts the item of content CA between a predetermined time $t_{Dad}$ and a predetermined time $t_{Fad}$ that are marked in the flow F2a.

With reference to FIG. 7B, a flow F2b is shown that is a variant of the flow F2a of FIG. 7A. In the example of FIG. 7B, the item of content CM is located in the flow F2b, just before the item of audiovisual content CA.

With reference to FIG. 7C, a flow F2c is shown that is another variant of the flow F2a of FIG. 7A. In the example of FIG. 7C, the item of content CM is located in the flow F2c, just after the item of audiovisual content CA.

Other configurations are of course possible. For example, several items of multimedia content CM could interrupt the item of content CA. According to another example, an item of multimedia content CM could be located in the flow F2a, F2b or F2c, just before and/or just after the item of content CA, while at least one other item of multimedia content CM could interrupt the item of content CA.

In the examples of FIGS. 7A to 7C, the time markers are signaled directly in the flow, that is to say in-band.

According to one embodiment, the abovementioned time markers are tags, such as for example SCTE 104/35 tags.

According to another embodiment shown in connection with FIGS. 8A to 8C, the abovementioned time markers are indicated:

in a signaling subflow SF2a associated with the flow F2a,
in a signaling subflow SF2b associated with the flow F2b,
in a signaling subflow SF2c associated with the flow F2c.

The signaling of the time markers is transmitted in the communication network RC (FIG. 1A or 1B) and not directly in the flow that contains the item of audiovisual content CA and the associated item of multimedia content CM. This is in this case out-band signaling.

The subflow SF2a (respectively SF2b, SF2c) contains information allowing the flow F2a (respectively F2b, F2c) to be analyzed by the access terminal TAC of the user UT of FIGS. 1A and 1B.

By way of non-exhaustive example, the consecutive items of multimedia content $CM_1, \ldots, CM_i, \ldots, CM_K$ in the item of multimedia content CM may be commercials, film trailers, music clips, etc. that are offered by partner content providers:

either from television channels $CT_1$ to $CT_X$ or radio stations $CR_1$ to $CR_Y$ shown in FIG. 1A,
or from the service provider that owns the service platform PFS of FIG. 1B.

Of course, the items of multimedia content $CM_1, \ldots, CM_i, \ldots, CM_K$ do not necessarily have the same duration.

According to the invention, and as will be described in more detail in the description below, it is proposed to substitute, on the fly in the flow F2a (respectively F2b, F2c), the rendering of at least two successive items of multimedia content $CM_i$, $CM_{i+1}$ present in the item of multimedia content CM by respectively rendering at least two substitute items of multimedia content of interest $CMI_u$, $CMI_v$ that are or are not tailored to the interests of the user UT of the terminal TER of FIGS. 1A and 1B.

According to the invention, with reference to FIGS. 7A and 7B, the flow F2a (respectively F2b) contains:

at a predetermined time $t_{Pi}$ before the start of the item of multimedia content $CM_i$, an item of access information $IA_u$ for accessing the item of multimedia content of interest $CMI_u$, at a predetermined time $t_{P+1}$ before the start of the item of multimedia content $CM_{i+1}$, an item of access information $IA_v$ for accessing the item of multimedia content of interest $CMI_v$.

According to another example shown with reference to FIG. 7C, the flow F2c contains, at a predetermined time $t_{Pi}$ before the start of the item of multimedia content $CM_i$, an item of access information $IA_u$ for accessing the item of multimedia content of interest $CMI_u$ and an item of access information $IA_v$ for accessing the item of multimedia content of interest $CMI_v$.

With reference to FIG. 9A, according to a variant embodiment of the flow F2a of FIG. 7A, a flow F'2a is shown that contains, directly in the item of audiovisual content CA:

at a predetermined time $t_{Pi}$ before the start of the item of multimedia content $CM_i$, an item of access information $IA_u$ for accessing the item of multimedia content of interest $CMI_u$, at a predetermined time $t_{Pi+1}$ before the start of the item of multimedia content $CM_{i+1}$, an item of access information $IA_v$ for accessing the item of multimedia content of interest $CMI_v$.

With reference to FIG. 9B, according to a variant embodiment of the flow F2c of FIG. 7C, a flow F'2c is shown that contains, directly in the item of audiovisual content CA, at a predetermined time $t_{Pi}$ before the start of the item of multimedia content $CM_i$, an item of access information $IA_u$ for accessing the item of multimedia content of interest $CMI_u$ and an item of access information $IA_v$ for accessing the item of multimedia content of interest $CMI_v$.

If the predetermined times $t_{Pi}$ and $t_{Pi+1}$ are marked in time by two SCTE 104/35 tags:

with reference to FIGS. 7A, 7B and 9A, the SCTE 104/35 tag at the predetermined time $t_{Pi}$ comprises a data field containing the item of access information $IA_u$ and the SCTE 104/35 tag at the predetermined time $t_{Pi+1}$ comprises a data field containing the item of access information $IA_v$;

with reference to FIGS. 7C and 9B, the SCTE 104/35 tag at the predetermined time $t_{Pi}$ comprises a data field containing the item of access information $IA_u$ and the item of access information $IA_v$.

If the predetermined times $t_{Pi}$ and $t_{Pi+1}$ are entered in the respective signaling subflows SF2a, SF2b, SF2c of the flows F2a, F2b, F2c:

with reference to FIGS. 8A and 8B, each signaling subflow SF2a, SF2b contains a data field associating the predetermined time $t_{Pi}$ with the item of access information $IA_u$ and a data field associating the predetermined time $t_{Pi+1}$ with the item of access information $IA_v$, with reference to FIG. 8C, the signaling subflow SF2c of the flow F2c contains a data field associating the predetermined time $t_{Pi}$ with the item of access information $IA_u$ and with the item of access information $IA_v$.

According to variant embodiments of FIGS. 7A to 7C, 8A to 8C and 9A to 9B, if the flows F2a, F2b, F2c, F'2a, F'2c are broadcast by a given television channel, for example the television channel $CT_j$ in FIG. 1A, or else by a given radio station, for example the radio station $CR_k$ in FIG. 1A, the flows F2a, F2b, F2c, F'2a, F'2c and the subflows SF2a, SF2b, SF2c each contain time markers associated with items of access information for accessing items of content of interest intended to be substituted for the rendering of items of multimedia content broadcast on a channel or station other than the channel or station $CT_j$ or $CR_k$.

According to the invention, the item of access information $IA_u$ (respectively $IA_v$) is, by way of non-exhaustive example:

an instruction addressed to the access terminal TAC of FIGS. 1A and 1B so that the latter determines, for current item of content under consideration from among the successive items of multimedia content $CM_1, \ldots, CM_i, \ldots CM_K$, for example the item of content $CM_{i-1}$, whether the rendering of the following item of multimedia content $CM_i$ should or should not be substituted with the rendering of an item of content of interest selected from the set ES of items of content of interest of FIGS. 1A and 1B, an access address, for example a URL ("Uniform Resource Locator"), for accessing, via a communication network, for example the network RC in FIGS. 1A and 1B, an item of content of interest from the set ES of items of content of interest $CMI_1, CMI_2, \ldots, CMI_u, \ldots, CMI_v, \ldots, CMI_T$, an item of information deduced from an item of information corresponding to the next item of multimedia content to be read, such as for example an item of metadata, a word intended to be spoken or displayed during the rendering of this item of multimedia content, etc., an identifier of an item of multimedia content of interest, such as for example the name of the file containing this item of multimedia content of interest, at least one item of user profile information, such as for example one or more district identifiers, an age or an age range, the value of an income or an income range, a duration of watching television in hours per day, etc.

With reference to FIG. 10, consideration is now given to the simplified structure of a reception device REC' for receiving flows according to a second embodiment of the invention. The device REC' is identical in all respects to the device REC in FIG. 4. The elements forming it are therefore represented by the same reference numbers as the elements of FIG. 4.

Such a reception device REC' is contained in the access terminal TAC of FIGS. 1A and 1B, according to one exemplary embodiment of the invention. Such a flow reception device is designed to implement the flow reception method according to the second embodiment that will be described below with reference to FIG. 11.

In the reception device REC' of FIG. 10:

the first reading module ML1 is designed to read the item of audiovisual content CA contained in the flow, including the successive items of multimedia content $CM_1, \ldots, CM_i, \ldots CM_K$ of the item of multimedia content CM associated with the item of audiovisual content CA, the module DEC is designed to implement audio/video decoding of the data of the item of audiovisual content CA and of the successive items of multimedia content of the item of content CM, said data possibly being of text, audio, video or audiovisual type, a memory MEM for storing data, such as for example a buffer memory.

The reception device REC' comprises hardware and/or software resources, in particular a processing module MT for implementing the flow reception method according to the invention that will be described below.

According to the second embodiment of the invention, for at least first and second successive items of multimedia content $CM_i$, $CM_{i+1}$ of the item of multimedia content CM associated with the item of content CA:

the second reading module ML2 reads a first item of multimedia content of interest $CMI_u$ in parallel with the reading of the item of multimedia content $CM_i$ by the first reading module ML1, the third reading module ML3 reads a second item of multimedia content of interest $CMI_v$ in parallel with the reading of the item of multimedia content $CM_{i+1}$ by the first reading module ML1, the rendering control module COR commands the rendering, by the rendering module RST:

either of the item of audiovisual content CA read by the reading module ML1, or various consecutive items of multimedia content $CM_1, \ldots, CM_i, \ldots CM_K$ in the item of multimedia content CM and read by the reading module ML1, taking into account the markup information indicated in the received flow and the item and/or the items of access information associated with this markup information, or of each item of content of interest read by the reading module ML2 (respectively ML3), instead of a given item of multimedia content $CM_i$ (respectively $CM_{i+1}$) of the item of multimedia content CM, taking into account the markup information indicated in the received flow and the item and/or the items of access information associated with this markup information.

A second embodiment of the flow reception method according to the invention is now described with reference to FIG. 11. This second embodiment is implemented by the reception device REC' of FIG. 9:

Such a method takes place as follows:

At S'1, the communication module COM of FIG. 10 receives a flow F2a (respectively F2b, F2c, F'2a, F'2c) of the type shown in FIGS. 7A to 7C, 8A to 8C, 9A to 9B. As already explained above in the description, such a flow is representative of an item of audiovisual content CA and comprises, in relation to the item of content CA, at least one item of multimedia content CM inside which there are a plurality of consecutive items of content $CM_1, \ldots, CM_i, \ldots CM_K$.

At S'2, the analysis module ANA of FIG. 10 then reads the various time markers inserted into the flow.

At S'3, following the reading of the time marker $t_{Dc}$ indicating the start of the item of content CA (FIGS. 7A, 7C, 8A, 8C, 9A, 9B) or of the time marker $t_{Dad}$ indicating the start of the item of multimedia content CM (FIGS. 7B, 8B), the processing module MT activates the first reading module ML1 in order to read either the item of content CA or, directly, the successive items of multimedia content $CM_1, \ldots, CM_i, \ldots CM_K$.

At S'4, the rendering control module COR commands the rendering module RST such that it renders the item of audiovisual content CA or the item of multimedia content CM on the peripheral device PER of FIG. 10, as either of them are read at S'3.

At S'5, at a predetermined time $t_{Pi}$ before the start time $t_{Di}$ of an item of multimedia content $CM_i$ under consideration in the flow F2a (respectively F2b, F2c, F'2a, F'2c), the analysis module ANA determines that the rendering of the item of multimedia content $CM_i$ should be replaced by the rendering of an item of multimedia content of interest of the same duration as the item of multimedia content $CM_i$ and that corresponds to the interests of the user UT of the reception device REC'.

To this end, the analysis module ANA reads an item of access information $IA_u$ for accessing the item of multimedia content of interest $CMI_u$ from the flow F2a (respectively F2b, F2c, F'2a, F'2c).

It is assumed that, at the predetermined time $t_{Pi}$ before the start time $t_{Di}$ of an item of multimedia content $CM_i$, the first reading module ML1 reads the item of multimedia content $CM_{i-1}$ that temporally precedes the item of multimedia content $CM_i$ in the time segment $CM_i$.

At S'6, the processing module MT activates the second reading module ML2 so that the latter loads the first data packets $PAQ_u$ relating to the item of content of interest $CMI_u$, before the start time $t_{Di}$ of the item of multimedia content $CM_i$.

At S'7, at the start time $t_{Di}$ of the item of multimedia content $CM_i$, the second reading module ML2 reads the item of content of interest $CMI_u$.

At S'8, at the start time $t_{Di}$ of the item of multimedia content $CM_i$, the rendering control module COR then commands the rendering, by the rendering module RST, of the item of content of interest $CMI_u$ read by the reading module ML2, instead of the rendering of the item of multimedia content $CM_i$ that is read by the first reading module ML1. As shown in FIG. 10, the rendering of the item of multimedia content of interest $CMI_u$ is implemented exactly between the start time $t_{Di}$ and the end time $t_{Fi}$ of the item of multimedia content $CM_i$, such that the user UT does not perceive the substitution of the rendering of the item of multimedia content $CM_i$ that is implemented, advantageously, without a break in the flow.

No latency phenomenon is caused between the time $t_{Fi-1}$ when the first reading module ML1 finishes reading the item of multimedia content $CM_{i-1}$, the synchronous rendering of which is implemented by the rendering module RST, and the time $t_{Di}$ when the second reading module ML2 starts to read the item of content of interest $CMI_u$, since the reading module ML2 already had the first data packets $PAQ_u$ of the item of content of interest $CMI_u$, as obtained at S'6.

At S'9, at a predetermined time $t_{Pi+1}$ before the start time $t_{Di+1}$ of the item of multimedia content $CM_{i+1}$ that directly follows the item of multimedia content $CM_i$ in the item of multimedia content CM, and while the second reading module ML2 is still currently reading the item of multimedia content of interest $CMI_u$ and the module COR is synchronously commanding the rendering thereof, the analysis module ANA determines that the rendering of the item of multimedia content $CM_{i+1}$ should be replaced by an item of multimedia content of interest $CMI_v$ of the same duration as the item of multimedia content $CM_{i+1}$.

To this end, the analysis module ANA reads an item of access information $IA_v$ for accessing said item of multimedia content of interest $CMI_v$ from the flow F2a (respectively F2b, F2c, F'2a, F'2c).

At S'10, the processing module MT activates the third reading module ML3 so that the latter loads the first data packets $PAQ_v$ relating to the item of content of interest $CMI_v$, before the start time $t_{Di+1}$ of the item of multimedia content $CM_{i+1}$.

At S'11, at the start time $t_{Di+1}$ of the item of multimedia content $CM_{i+1}$, the processing module MT deactivates the second reading module ML2, the third reading module ML3 then reading the item of content of interest $CMI_v$.

At S'12, at the start time $t_{Di+1}$ of the item of multimedia content $CM_{i+1}$, the rendering control module COR then commands the rendering of the item of content of interest $CMI_v$ instead of the rendering of the item of multimedia content $CM_{i+1}$ that is currently being read by the first reading module ML1. As shown in FIG. 10, the rendering of the item of content of interest $CMI_v$ is implemented exactly between the start time $t_{Di+1}$ and the end time $t_{Fi+1}$ of the item of multimedia content $CM_{i+1}$, such that the user UT does not perceive the substitution that is thus implemented without a break in the flow.

No latency phenomenon is caused between the time $t_{Fi}$ when the second reading module ML2 finishes reading the item of content of interest $CMI_u$ and the time $t_{Di+1}$ when the third reading module ML3 starts to read the item of content of interest $CMI_v$, since the reading module ML3 already had the first data packets $PAQ_v$ of the item of content of interest $CMI_v$, as obtained at S'10.

As an alternative to the method that has just been described above, operations S'6 and S'10 are carried out together, at the predetermined time $t_{Pi}$ before the start time $t_{Di}$ of an item of multimedia content $CM_i$ under consideration in the flow, thereby making it possible to anticipate the preloading of the data of the item of content of interest $CMI_v$ to an even greater extent.

By virtue of the flow reception method that has just been described, it is thus possible to substitute, on the fly, the rendering of at least two successive items of multimedia content in the item of multimedia content CM associated with an item of audiovisual content CA, by respectively rendering two substitute items of multimedia content or items of multimedia content matching the interests of the user UT.

Of course, more than two successive items of multimedia content present in the item of multimedia content CM may be substituted. Thus, for example, the reading modules ML2 and ML3 will again be activated respectively if the processing module MT determines for example that the successive items of multimedia content $CM_{i+2}$, $CM_{i+3}$, and then $CM_{i+5}$, $CM_{i+6}$ should be substituted, etc.

In the example of FIG. 10, it is considered that the item of multimedia content $CM_{i+2}$, which follows the item of multimedia content $CM_{i+1}$ in the item of multimedia content, should not be substituted because for example the item of access information $IA_w$ for accessing an item of content of interest $CMI_w$ of the item of content $CM_{i+2}$, which is read by the analysis module ANA at a predetermined time $t_{Pi+2}$ before the start time $t_{Di+2}$ of the item of content $CM_{i+2}$, does not ultimately link to any item of content of interest. In this example, therefore, at the time $t_{Di+2}$, the first reading module ML1 reads the item of multimedia content $CM_{i+2}$, which is rendered synchronously on the device PER, the third reading module ML3 being deactivated.

According to one preferred embodiment, the items of content of interest $CMI_u$ and $CMI_v$ accessed respectively via the items of access information $IA_u$ and $IA_v$ are downloaded into the memory MEM of the reception device REC', prior to the start time $t_{Dad}$ of the item of multimedia content CM, in the form of files, such as for example:
- of mp4 type and having for example the names "spotu.mp4" and "spotv.mp4",
- of mp3 type and having for example the names "spotu.mp3" and "spotv.mp3",
- of jpeg type and having for example the names "spotu.jpg" and "spotv.jpg".

Each item of content of interest $CMI_u$ and $CMI_v$ is downloaded from the content server SC of FIGS. 1A and 1B, following the reception of a request from the reception device REC', said request containing:
- one and/or more items of criteria information CRT of the user UT, as mentioned above,
- an identifier of the reception device REC',
- an identifier $I_{CM}$ associated either with the item of content $CM_i$ (respectively $CM_{i+1}$) or with the item of multimedia content CM that comprises this item of content.

Such an embodiment is implemented if the item of content CA, which the user UT is currently watching and/or listening to, precedes the item of multimedia content CM, as in the case of FIGS. 7A, 7C, 8A, 8C, 9A, 9B.

According to this preferred embodiment, the items of access information $IA_u$, $IA_v$ read by the analysis module ANA are identifiers of the abovementioned items of content of interest $CMI_u$, $CMI_v$.

According to another embodiment, with reference to FIGS. 1A, 1B and 10, if for example the user UT turns on the television or the radio at the time when the item of multimedia content CM is being broadcast, and for example the item of multimedia content $CM_{i-1}$ is currently being rendered, the items of access information $IA_u$, $IA_v$ read by the analysis module ANA are URL links allowing the reception device REC' to respectively access the items of content of interest $CMI_u$, $CMI_v$ stored in the content server SC of FIGS. 1A and 1B, so that they are read directly by the reading modules ML2 and ML3, respectively. Each URL is contained in a request from the reception device REC', said request containing:
- one and/or more items of criteria information CRT of the user UT, as mentioned above,
- an identifier of the reception device REC',
- an identifier $I_{CM}$ associated either with the item of content $CM_i$ (respectively $CM_{i+1}$) or with the item of multimedia content CM that comprises this item of content.

As a variant of this other embodiment and with reference to FIGS. 8A to 8C, the items of access information $IA_u$, $IA_v$ read by the analysis module ANA are flow pointers allowing the reception device REC' to access the items of content of interest $CMI_u$, $CMI_v$ directly from the subflows SF2a (respectively SF2b, SF2c).

According to another embodiment, and with reference to FIGS. 1A, 1B and 10, each item of access information $IA_u$, $IA_v$ contains at least one item of user profile information, such as for example one or more district identifiers, an age or an age range, the value of an annual income or an annual income range, a duration of watching television in hours per day, etc. Following the reading of each item of access information $IA_u$, $IA_v$ by the analysis module ANA, the processing module MT of the reception device REC' checks whether said at least one item of profile information corresponds to at least one criterion CRT of the user UT. If this is the case, the rendering of the items of multimedia content $CM_i$, $CM_{i+1}$ is substituted by respectively rendering the items of multimedia content of interest $CMI_u$, $CMI_v$. If this is not the case, the reading modules ML2 and ML3 are not activated and the first reading module ML1 conventionally reads the items of content $CM_i$, $CM_{i+1}$, the successive rendering of which on the device PER of FIG. 10 is implemented by the rendering module RST.

According to yet another embodiment, each item of access information $IA_u$, $IA_v$ is an instruction transmitted to the processing module MT of FIGS. 1A and 1B, which determines, for a given item of multimedia content $CM_i$, whether or not this item of content should be substituted, on the basis of various criteria that may be linked to the subscription of the user UT, to the capacities of the reception device REC', to the bandwidth evaluated at the predetermined time $t_{Pi}$, before the start of the item of multimedia content $CM_i$.

The second embodiment that has just been described with reference to FIGS. 7 to 11 is particularly suitable for the substitution of commercials intended to be watched/listened to by the user before or after the broadcasting of the item of audiovisual content CA or even during the interruption of the item of content CA, specifically on a case by case, that is to say commercial by commercial basis. The user will therefore be much less inclined to change channels or stations or skip the advertising break, since the commercials of interest rendered instead of the commercials provided by default in the advertising break will be in line with the interests of the user, in other words his/her profile and/or his/her personal tastes, at the current time of broadcasting of the item of audiovisual content.

It goes without saying that the embodiments described above have been given purely by way of completely non-limiting indication, and that numerous modifications may be easily made by a person skilled in the art without otherwise departing from the scope of the invention.

The invention claimed is:

1. A method of receiving a flow representative of an item of multimedia content, the method being implemented by a device configured to receive the flow, the method comprising:
   activating a first reading procedure for reading the item of multimedia content, and
   rendering the read item of multimedia content,
   the method further comprising:
      determining, in the flow representative of the item of multimedia content, at first and second times respectively prior to first and second rendering times of first and second contiguous portions of the item of multimedia content that the rendering of the first and second contiguous portions should be modified by the rendering of first and second respective items of multimedia content, the first and second times associated respectively with a first item of access information for accessing the first item of multimedia content and a second item of access information for accessing the second item of multimedia content, the determining comprising
         at the first time prior to the first rendering time, reading the first item of access information to access the first item of multimedia content, where the first item of multimedia content has already been downloaded to the device; and
         at the second time prior to the second rendering time, reading the second item of access information to access the second item of multimedia content, where the second item of multimedia content has already been downloaded to the device;
      activating:
         a second reading procedure for reading the downloaded first item of multimedia content in parallel with the reading of the first portion, and
         a third reading procedure for reading the downloaded second item of multimedia content in parallel with the reading of the second portion, and
      at the first rendering time of the first portion, commanding the rendering, in the flow, of the first downloaded item of multimedia content that has been read, instead of or in addition to the rendering of the first portion, and
      at the second rendering time of the second portion, command the rendering, in the flow, of the second downloaded item of multimedia content that has been read, instead of or in addition to the rendering of the second portion.

2. The reception method of claim 1, wherein modifying the rendering of a given portion of the item of multimedia content comprises substituting the rendering of the given portion with the rendering of one of the first and second items of multimedia content.

3. The reception method of claim 1, wherein modifying the rendering of a given portion of the item of multimedia content comprises simultaneously rendering the given portion and one of the first and second items of multimedia content.

4. The reception method of claim 1, wherein the second reading procedure and the third reading procedure are activated after reading, in the flow, at a time before the start of the first portion of the item of multimedia content, of the first item of access information and the second item of access information.

5. The reception method of claim 1, wherein the first and/or second item of access information is determined from an item of information corresponding to the first and/or second item of multimedia content.

6. The reception method of claim 1, wherein the first and/or second item of access information comprises a multimedia content identifier.

7. The reception method of claim 1, wherein the first and/or second item of access information contains an instruction for determining whether the rendering of a given portion of the item of multimedia content, which has not yet been read, may or may not be modified by the rendering of an item of multimedia content.

8. The reception method of claim 1, wherein the first and/or second item of access information comprises an access address for accessing, via a communication network, the first and/or the second item of multimedia content.

9. The reception method of claim 1, wherein the first and/or second item of access information comprises an item of user profile information.

10. The reception method of claim 1, wherein the first or the second matching item of multimedia content is accessible:
    from the device configured to receive the flow, or
    from a content storage device connected via a communication network to the device configured to receive the flow, or
    in a subflow associated with the received flow.

11. A computer comprising a processor and a memory, the memory having stored thereon instructions which, when executed by the processor, cause the computer to implement the method of claim 1.

12. A non-transitory, computer-readable medium storing instructions that, when executed by a processor, cause the processor to implement the method of claim 1.

13. A reception device configured to receive a flow representative of an item of multimedia content, the reception device comprising a processor and a memory, the reception device configured to:
    read the item of multimedia content in a first reading procedure, and
    render the read item of multimedia content,
    the device being further configured to:
    determine, in the flow representative of the item of multimedia content, at first and second times respectively before first and second rendering times of first and second contiguous portions of the item of multimedia content that the rendering of the first and second contiguous portions should be modified by the rendering of first and second respective items of multimedia content the first and second times associated respectively with a first item of access information for accessing the first item of multimedia content and a second item of access information for accessing the second item of multimedia content, the determining comprising
- at the first time prior to the first rendering time, reading the first item of access information to access the first item of multimedia content, where the first item of multimedia content has already been downloaded to the device; and
- at the second time prior to the second rendering time, reading the second item of access information to access the second item of multimedia content, where the second item of multimedia content has already been downloaded to the device;

activate:
- a second reading procedure for reading the downloaded first item of multimedia content in parallel with the reading of the first portion, and
- a third reading procedure for reading the downloaded second item of multimedia content in parallel with the reading of the second portion, and at the first rendering time of the first portion, command the rendering, in the flow, of the first downloaded item of multimedia content that has been read, instead of or in addition to the rendering of the first portion, and at the second rendering time of the second portion, commanding the rendering, in the flow, of the second downloaded item of multimedia content that has been read, instead of or in addition to the rendering of the second portion.

\* \* \* \* \*